(12) United States Patent
Ishige et al.

(10) Patent No.: US 10,201,900 B2
(45) Date of Patent: Feb. 12, 2019

(54) CONTROL DEVICE, ROBOT, AND ROBOT SYSTEM

(71) Applicant: Seiko Epson Corporation, Tokyo (JP)

(72) Inventors: Taro Ishige, Matsumoto (JP); Atsushi Harada, Matsumoto (JP); Yukihiro Yamaguchi, Matsumoto (JP); Hiromitsu Abe, Chino (JP)

(73) Assignee: Seiko Epson Corporation (JP)

( * ) Notice: Subject to any disclaimer, the term of this patent is extended or adjusted under 35 U.S.C. 154(b) by 81 days.

(21) Appl. No.: 15/363,499

(22) Filed: Nov. 29, 2016

(65) Prior Publication Data

US 2017/0151671 A1    Jun. 1, 2017

(30) Foreign Application Priority Data

Dec. 1, 2015 (JP) .................................. 2015-235250

(51) Int. Cl.

| | |
|---|---|
| *B25J 19/00* | (2006.01) |
| *B25J 9/16* | (2006.01) |
| *G06K 9/00* | (2006.01) |
| *G06K 9/64* | (2006.01) |
| *G06K 9/78* | (2006.01) |
| *G06T 7/80* | (2017.01) |

(52) U.S. Cl.
CPC ........... *B25J 9/1692* (2013.01); *B25J 9/1697* (2013.01); *G06K 9/00355* (2013.01); *G06K 9/64* (2013.01); *G06K 9/78* (2013.01); *G06T 7/80* (2017.01); *G06T 2207/30108* (2013.01); *G06T 2207/30208* (2013.01)

(58) Field of Classification Search
USPC .................................................. 700/245–264
See application file for complete search history.

(56) References Cited

U.S. PATENT DOCUMENTS 4,367,891 A * 1/1983 Wauer .................. B25J 15/0009
269/266
4,891,767 A * 1/1990 Rzasa .................... B25J 9/1692
382/151

(Continued)

FOREIGN PATENT DOCUMENTS

| JP | 08-210816 A | 8/1996 |
| JP | 2016-097474 A | 5/2016 |

(Continued)

*Primary Examiner* — Jonathan L Sample
(74) *Attorney, Agent, or Firm* — Harness, Dickey & Pierce, P.L.C.

(57) ABSTRACT

A control device is capable of controlling each of a robot having a robot arm, and an imaging portion which is capable of capturing a first reference marker, a second reference marker, and a third reference marker, any one of the imaging portion, the first reference marker, the second reference marker, and the third reference marker is provided in the robot, and a posture of a reference surface parallel to a plane which passes through the first reference marker, the second reference marker, and the third reference marker, is acquired based on a first image in which the first reference marker is captured by the imaging portion, a second image in which the second reference marker is captured by the imaging portion, and a third image which captures the third reference marker by the imaging portion.

20 Claims, 20 Drawing Sheets

(56) References Cited

U.S. PATENT DOCUMENTS

| | | | | |
|---|---|---|---|---|
| 4,921,293 A * | 5/1990 | Ruoff | A61F 2/583 | 294/106 |
| 4,957,320 A * | 9/1990 | Ulrich | B25J 9/102 | 192/56.1 |
| 4,980,626 A * | 12/1990 | Hess | B25J 9/1005 | 250/559.33 |
| 5,108,140 A * | 4/1992 | Bartholet | B25J 15/0009 | 294/106 |
| 5,172,951 A * | 12/1992 | Jacobsen | A61F 2/588 | 294/104 |
| 5,501,498 A * | 3/1996 | Ulrich | B25J 9/102 | 294/106 |
| 5,762,390 A * | 6/1998 | Gosselin | B25J 15/0009 | 294/106 |
| 5,967,580 A * | 10/1999 | Rosheim | B25J 3/04 | 294/106 |
| 6,517,132 B2 * | 2/2003 | Matsuda | B25J 15/0009 | 294/106 |
| 6,721,444 B1 * | 4/2004 | Gu | B25J 9/1697 | 345/419 |
| 6,817,641 B1 * | 11/2004 | Singleton, Jr. | B25J 9/102 | 294/106 |
| 7,168,748 B2 * | 1/2007 | Townsend | B25J 9/1612 | 294/106 |
| 7,340,100 B2 * | 3/2008 | Higaki | G06F 3/017 | 382/199 |
| 7,549,688 B2 * | 6/2009 | Hayakawa | B25J 9/0009 | 294/106 |
| 8,036,452 B2 * | 10/2011 | Pettersson | G01B 11/005 | 382/154 |
| 8,280,837 B2 * | 10/2012 | Platt | B25J 9/1612 | 294/110.1 |
| 8,346,393 B2 * | 1/2013 | Kim | B25J 9/1612 | 700/261 |
| 8,463,434 B2 * | 6/2013 | Takahashi | B25J 9/1612 | 318/568.16 |
| 8,504,198 B2 * | 8/2013 | Takahashi | B25J 9/1612 | 700/245 |
| 9,020,240 B2 * | 4/2015 | Pettersson | G01B 11/005 | 382/154 |
| 9,927,222 B2 * | 3/2018 | Suzuki | G01B 11/002 | |
| 2001/0043719 A1 * | 11/2001 | Harakawa | G06F 3/011 | 382/106 |
| 2004/0028260 A1 * | 2/2004 | Higaki | G06F 3/017 | 382/118 |
| 2005/0125099 A1 * | 6/2005 | Mikami | G06N 3/008 | 700/245 |
| 2005/0159842 A1 * | 7/2005 | Ban | B25J 19/023 | 700/245 |
| 2006/0012198 A1 * | 1/2006 | Hager | B25J 9/1612 | 294/106 |
| 2006/0128316 A1 * | 6/2006 | Moller | G09B 23/32 | 455/67.15 |
| 2006/0195226 A1 * | 8/2006 | Matsukawa | B25J 9/162 | 700/245 |
| 2007/0010913 A1 * | 1/2007 | Miyamoto | B25J 9/1658 | 700/264 |
| 2007/0018470 A1 * | 1/2007 | Hayakawa | B25J 9/0009 | 294/106 |
| 2007/0219668 A1 * | 9/2007 | Takahashi | B25J 9/1612 | 700/249 |
| 2007/0236162 A1 * | 10/2007 | Kawabuchi | B25J 9/102 | 318/568.16 |
| 2008/0077361 A1 * | 3/2008 | Boyd | B25J 9/1612 | 702/189 |
| 2008/0114491 A1 * | 5/2008 | Takahashi | B25J 9/1612 | 700/245 |
| 2008/0235970 A1 * | 10/2008 | Crampton | B25J 13/088 | 33/503 |
| 2008/0253612 A1 * | 10/2008 | Reyier | B25J 9/1697 | 382/103 |
| 2009/0069942 A1 * | 3/2009 | Takahashi | B25J 9/1633 | 700/260 |
| 2009/0190826 A1 * | 7/2009 | Tate | H04N 1/00002 | 382/153 |
| 2009/0259337 A1 * | 10/2009 | Harrold | B25J 9/1692 | 700/245 |
| 2009/0302626 A1 * | 12/2009 | Dollar | B25J 9/104 | 294/106 |
| 2009/0306825 A1 * | 12/2009 | Li | B25J 9/1669 | 700/261 |
| 2010/0011899 A1 * | 1/2010 | Kim | B25J 9/104 | 74/490.04 |
| 2010/0080415 A1 * | 4/2010 | Qureshi | G16H 30/20 | 382/103 |
| 2010/0138039 A1 * | 6/2010 | Moon | B25J 9/1612 | 700/245 |
| 2010/0161125 A1 * | 6/2010 | Aoba | B25J 9/1692 | 700/254 |
| 2010/0161130 A1 * | 6/2010 | Kim | B25J 9/1612 | 700/261 |
| 2010/0179689 A1 * | 7/2010 | Lin | G05B 19/41865 | 700/250 |
| 2010/0280663 A1 * | 11/2010 | Abdallah | H01R 13/17 | 700/264 |
| 2011/0039021 A1 * | 2/2011 | Persson | A63C 19/065 | 427/137 |
| 2011/0066393 A1 * | 3/2011 | Groll | B25J 9/1676 | 702/94 |
| 2011/0067521 A1 * | 3/2011 | Linn | B25J 15/0009 | 74/490.06 |
| 2012/0059517 A1 * | 3/2012 | Nomura | B25J 9/1612 | 700/259 |
| 2012/0158358 A1 * | 6/2012 | Yogo | G01B 11/24 | 702/167 |
| 2012/0283875 A1 * | 11/2012 | Klumpp | B25J 9/1648 | 700/258 |
| 2012/0294509 A1 * | 11/2012 | Matsumoto | B25 5/007 | 382/153 |
| 2012/0306876 A1 * | 12/2012 | Shotton | G06T 17/10 | 345/424 |
| 2013/0114861 A1 * | 5/2013 | Takizawa | G06T 7/004 | 382/106 |
| 2013/0325179 A1 * | 12/2013 | Liao | B25J 9/1692 | 700/254 |
| 2015/0146215 A1 * | 5/2015 | Kobayashi | G01B 11/2504 | 356/610 |
| 2015/0290795 A1 * | 10/2015 | Oleynik | G05B 19/42 | 700/257 |
| 2015/0335390 A1 * | 11/2015 | Gill | G06T 7/0014 | 600/424 |
| 2016/0059419 A1 * | 3/2016 | Suzuki | B25J 9/1697 | 700/114 |
| 2016/0071272 A1 * | 3/2016 | Gordon | G06T 7/80 | 348/48 |
| 2016/0082598 A1 * | 3/2016 | Anducas Aregall | B25J 19/022 | 382/153 |
| 2016/0155235 A1 * | 6/2016 | Miyatani | G06K 9/036 | 382/103 |
| 2016/0183419 A1 * | 6/2016 | Fujita | H05K 13/0452 | 29/739 |
| 2016/0271802 A1 * | 9/2016 | Hiruma | B25J 9/1697 | |
| 2016/0279800 A1 * | 9/2016 | Onda | B25J 9/1697 | |
| 2016/0288332 A1 * | 10/2016 | Motoyoshi | B25J 9/1697 | |
| 2016/0288333 A1 * | 10/2016 | Yamaguchi | B25J 9/1697 | |
| 2016/0354929 A1 * | 12/2016 | Ishige | B25J 9/1697 | |
| 2017/0066137 A1 * | 3/2017 | Harada | B25J 13/085 | |
| 2017/0098309 A1 * | 4/2017 | Michel | B25J 9/1692 | |

FOREIGN PATENT DOCUMENTS

| | | |
|---|---|---|
| JP | 2016-182648 A | 10/2016 |
| JP | 2016-185572 A | 10/2016 |
| JP | 2016-187844 A | 11/2016 |
| JP | 2016-187845 A | 11/2016 |

(56) References Cited

FOREIGN PATENT DOCUMENTS

| JP | 2016-187846 A | 11/2016 |
| WO | WO-2016-079967 A1 | 5/2016 |

* cited by examiner

CONTROL DEVICE, ROBOT, AND ROBOT SYSTEM

BACKGROUND

1. Technical Field

The present invention relates to a control device, a robot, and a robot system.

2. Related Art

From the related art, a robot system which is used in work of gripping, transporting, and assembling a target, such as an electronic component, is known. The robot system includes: a robot including a robot arm having a plurality of arms, and a hand provided at a tip end thereof; an imaging portion, such as a camera; and a control device which controls each of the robot and the imaging portion. In a robot system having such a configuration, for example, the robot performs various types of work with respect to the target with the hand based on an image of the target captured by the imaging portion.

Here, it is necessary to calibrate the imaging portion which acquires a correction parameter for converting a position and a posture on the image of the target captured by the imaging portion into a value in a robot coordinate system so that the robot accurately performs the work with respect to the target based on the image captured by the imaging portion.

For example, in JP-A-8-210816, processing of acquiring the parameter which converts a position on the image into a value in the robot coordinate system by using a robot-visual sensor system (robot system) is described. The robot-visual sensor system described in JP-A-8-210816 includes: a robot including a robot arm and a touch-up hand provided at a tip end thereof; a visual sensor (imaging portion) provided at the tip end of the robot arm; and a calibration tool provided with a plane having three reference points and four reference points.

In the processing described in JP-A-8-210816, first, by bringing the touch-up hand into contact with the three reference points, the position and the posture of the calibration tool in the robot coordinate system are determined. After this, by capturing the four reference points using the visual sensor by driving the robot arm, and by determining the position of the calibration tool in an image coordinate system of the imaging portion, the parameter which converts a position on the image into a value in the robot coordinate system is acquired.

However, in the processing described in JP-A-8-210816, as described above, by bringing the touch-up hand into contact with the three reference points, the position of the calibration tool in the robot coordinate system is determined. In the calibration processing of the related art, in general, since a worker confirms a contact state between the calibration tool and the touch-up hand, differences in determination of the contact state are generated according to a worker. Therefore, it is difficult to determine the position and the posture of the calibration tool with high accuracy.

In addition, there is a problem that it takes a long period of time in determining the position and the posture of the calibration tool in order for the determination of the contact state to be accurately performed by a worker. Therefore, as the number of robots which are calibration targets increases, the problem becomes more serious.

SUMMARY

An advantage of some aspects of the invention is to solve at least a part of the problems described above, and the invention can be implemented as the following aspects.

A control device according to an aspect of the invention is a control device which is capable of controlling each of a robot including a robot arm, and an imaging portion which is capable of capturing a first reference marker, a second reference marker, and a third reference marker, in which any one of the imaging portion, the first reference marker, the second reference marker, and the third reference marker is provided in the robot, and by changing a posture of the robot arm, each distance between the imaging portion, and the first reference marker, the second reference marker, and the third reference marker, can be changed, and in which a posture of a reference surface parallel to a plane which passes through the first reference marker, the second reference marker, and the third reference marker, is acquired based on a first image in which the first reference marker is captured by the imaging portion, a second image in which the second reference marker disposed at a position different from the first reference marker is captured by the imaging portion, and a third image which captures the third reference marker disposed at a position different from the first reference marker and the second reference marker by the imaging portion.

According to the control device, since it is possible to acquire the posture of the reference surface based on the images (the first image, the second image, and the third image) captured by the imaging portion, similar to in the related art, it is possible to reduce variation caused by a human error or variation caused by a worker more than in a case where the posture of the reference surface is acquired by determination of a contact state with respect to a calibration member (calibration tool) by the worker. In addition, since it is possible to acquire the posture of the reference surface in a non-contact state, for example, it is possible to avoid a change in the posture of the reference surface according to a material or the like of the calibration member. Due to this, according to the control device according to the aspect of the invention, it is possible to acquire the posture of the reference surface with high accuracy. In addition, according to the control device of the invention, since it is possible to acquire the posture of the reference surface based on the image captured by the imaging portion, it is possible to acquire the posture of the reference surface more simply and rapidly than in the related art.

In the control device according to the aspect of the invention, it is preferable that the posture is acquired based on the coordinates of an arbitrary part of the robot in a robot coordinate system when the first image is captured, the coordinates of the part in the robot coordinate system when the second image is captured, and the coordinates of the part in the robot coordinate system when the third image is captured.

With this configuration, it is possible to determine the posture of the reference surface including an arbitrary part (for example, axial coordinates) of the robot. Therefore, as the robot performs various types of work on the reference surface, the robot can accurately perform various types of work based on the image captured by the imaging portion.

In the control device according to the aspect of the invention, it is preferable that the posture is acquired based on a size of the first reference marker in the first image, a size of the second reference marker in the second image, and a size of the third reference marker in the third image.

With this configuration, it is possible to accurately obtain the posture of the reference surface based on the image captured by the imaging portion.

In the control device according to the aspect of the invention, it is preferable that, in a case where the sizes of the first reference marker, the second reference marker, and the third reference marker are the same as each other, in the imaging portion, the first image, the second image and the third image are captured to allow the size of the first reference marker in the first image, the size of the second reference marker in the second image, and the size of the third reference marker in the third image to be the same as each other.

With this configuration, it is possible to simply and rapidly acquire the posture of the reference surface based on the image captured by the imaging portion.

In the control device according to the aspect of the invention, it is preferable that the first reference marker, the second reference marker, and the third reference marker are configured to have a plurality of markers which are disposed at a predetermined interval, and the posture is acquired based on a first interval between the plurality of markers of the first reference marker in the first image, a second interval between the plurality of markers of the second reference marker in the second image, and a third interval between the plurality of markers of the third reference marker in the third image.

With this configuration, it is possible to acquire the posture of the reference surface without performing processing of strictly adjusting focus with respect to each of the first reference marker, the second reference marker, and the third reference marker.

In the control device according to the aspect of the invention, it is preferable that, in a case where the first interval of the first reference marker, the second interval of the second reference marker, and the third interval of the third reference marker are the same as each other, in the imaging portion, the first image, the second image, and the third image are captured to allow the first interval in the first image, the second interval in the second image, and the third interval in the third image to be the same as each other.

With this configuration, it is possible to easily and rapidly acquire the posture of the reference surface without strictly adjusting focus with respect to each of the first reference marker, the second reference marker, and the third reference marker.

In the control device according to the aspect of the invention, it is preferable that the reference surface is orthogonal to an optical axis of the imaging portion.

With this configuration, as the robot performs various types of work with respect to the reference surface orthogonal to the optical axis of the imaging portion, the robot can accurately perform various types of work based on the image captured by the imaging portion. In addition, it is possible to easily perform processing of acquiring a relationship between an image coordinate system of the imaging portion and a robot coordinate system.

In the control device according to the aspect of the invention, it is preferable that the posture is acquired based on a first distance between the first reference marker acquired based on the first image and an imaging reference point of the imaging portion, a second distance between the second reference marker acquired based on the second image and the imaging reference point, and a third distance between the third reference marker acquired based on the third image and the imaging reference point.

With this configuration, it is possible to acquire the posture of the reference surface without performing processing of strictly adjusting focus with respect to each of the first reference marker, the second reference marker, and the third reference marker.

In the control device according to the aspect of the invention, it is preferable that the first distance, the second distance, and the third distance are the same as each other.

With this configuration, it is possible to simply and rapidly acquire the posture of the reference surface without performing processing of strictly adjusting focus with respect to each of the first reference marker, the second reference marker, and the third reference marker.

In the control device according to the aspect of the invention, it is preferable that an origin point of the reference surface is acquired.

With this configuration, a worker may easily ascertain the position of the reference surface by determining the origin point of the reference surface.

In the control device according to the aspect of the invention, it is preferable that the imaging portion is capable of capturing a fourth reference marker, and in a case where a first straight line which passes through the first reference marker and the second reference marker, and a second straight line which passes through the third reference marker and the fourth reference marker, are disposed to intersect each other, each of the first reference marker, the second reference marker, the third reference marker, and the fourth reference marker are captured by the imaging portion, the first straight line and the second straight line are acquired from the coordinates of the first reference marker in the robot coordinate system when the first reference marker is captured, the coordinates of the second reference marker in the robot coordinate system when the second reference marker is captured, the coordinates of the third reference marker in the robot coordinate system when the third reference marker is captured, and the coordinates of the fourth reference marker in the robot coordinate system when the fourth reference marker is captured, and an origin point of the reference surface in the robot coordinate system is acquired based on the acquired first straight line and the second straight line.

With this configuration, it is possible to easily acquire the origin point of the reference surface.

A robot according to another aspect of the invention is controlled by the control device according to the aspect of the invention.

According to the robot, it is possible to accurately perform various types of work.

A robot system according to still another aspect of the invention includes: the control device according to the aspect of the invention; a robot which is controlled by the control device; and an imaging portion which has a capturing function.

According to the robot system, the robot can accurately perform various types of work based on the image captured by the imaging portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a control device, a robot, and a robot system according to the invention will be described based on appropriate embodiments illustrated in the attached drawings.

First Embodiment

Robot System

Figure 1:
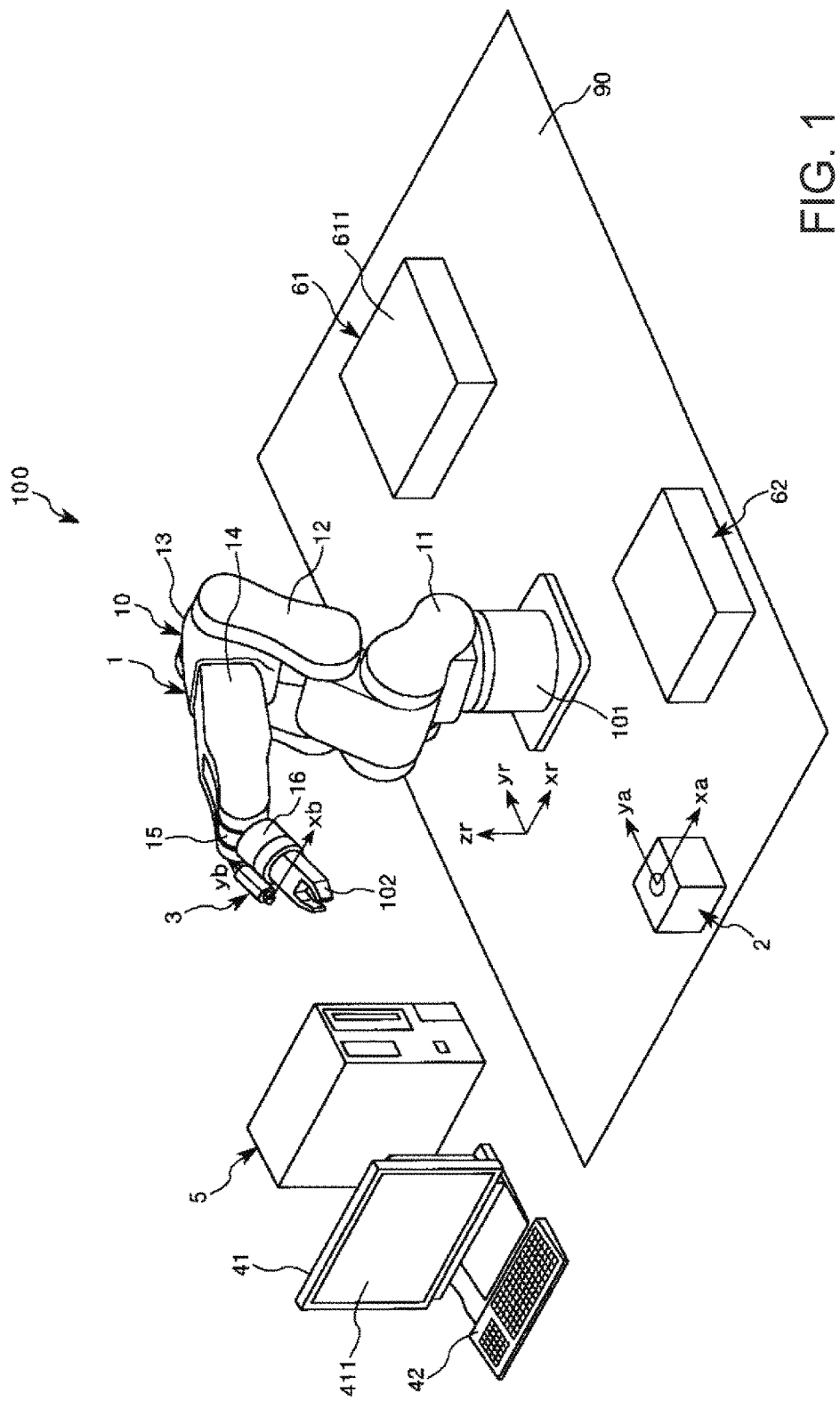
FIG. 1 is a schematically perspective view illustrating a robot system according to a first embodiment of the invention.
Figure 2:
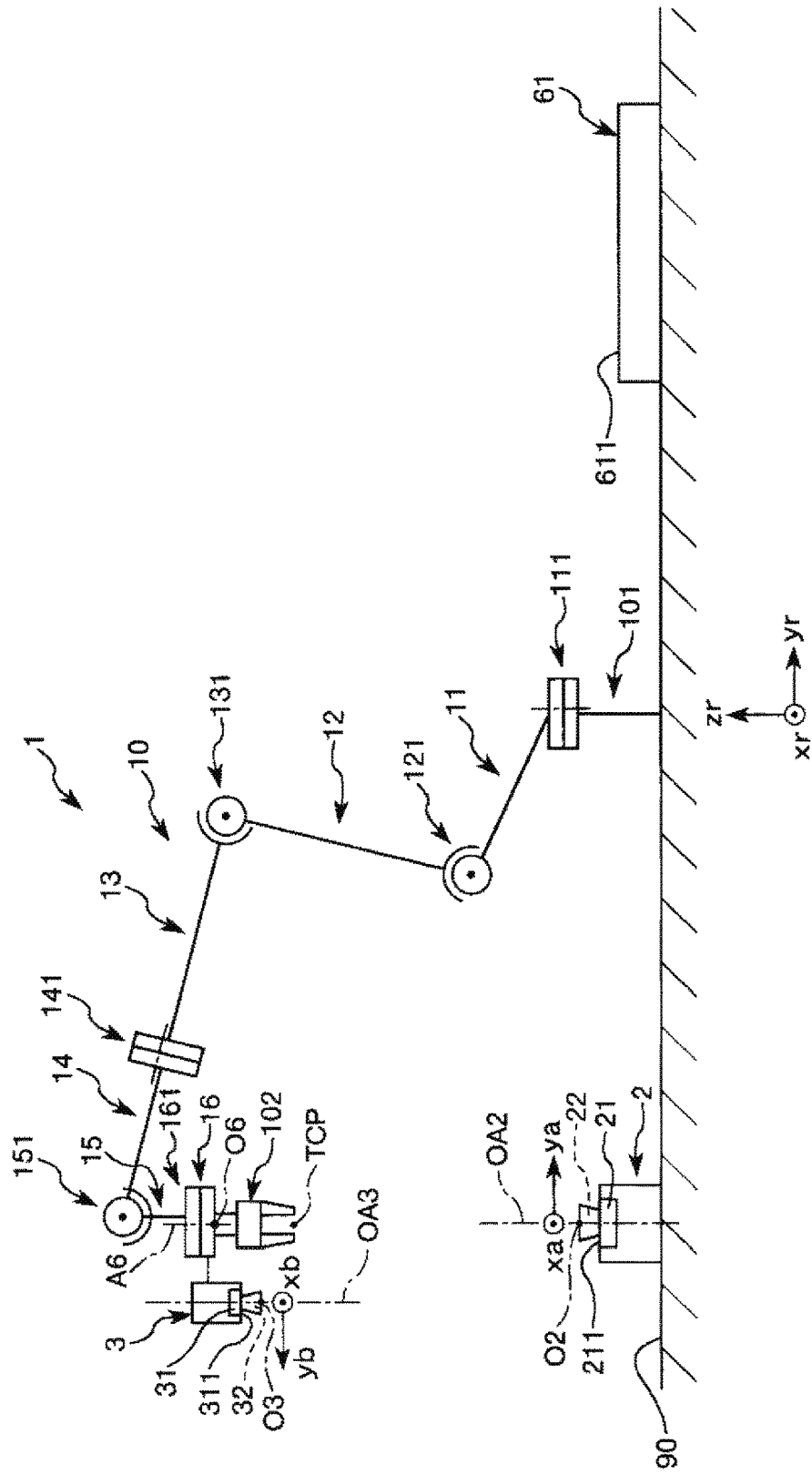
FIG. 2 is a schematic view of a robot illustrated in FIG. 1.
Figure 3:
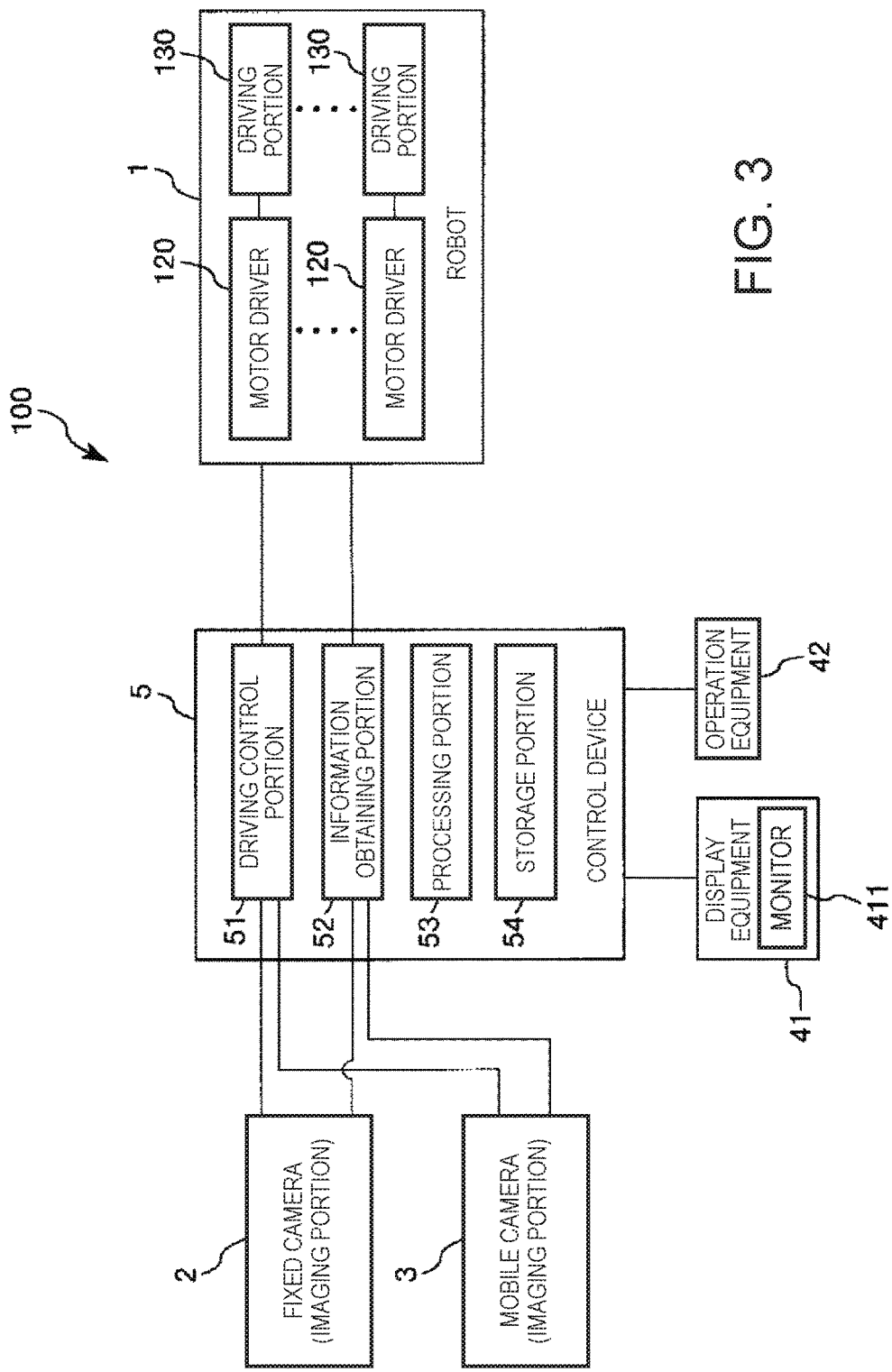
FIG. 3 is a block diagram of the robot system illustrated in FIG. 1.

FIG. 1 is a schematically perspective view illustrating the robot system according to a first embodiment of the invention. FIG. 2 is a schematic view of the robot illustrated in FIG. 1. FIG. 3 is a block diagram of the robot system illustrated in FIG. 1.

In addition, hereinafter, for convenience of the description, an upper side in FIG. 2 is referred to as "up" or "upper part", and a lower side is referred to as "down" or "lower part". In addition, the upward-and-downward direction in FIG. 2 is referred to as "vertical direction", a surface which intersects the vertical direction is referred to as "horizontal surface", and the direction parallel to the horizontal surface is referred to as "horizontal direction". Here, "horizontal" described in the specification also includes a case of being inclined within a range of equal to or less than 5° with respect to a horizontal state not being limited to being completely horizontal. In addition, "vertical" described in the specification also includes a case of being inclined within a range of equal to or less than 5° with respect to a vertical state not being limited to being completely vertical. In addition, a base side of the robot in FIG. 2 is referred to as "base end", and an opposite side (hand side) is referred to as "tip end".

A robot system 100 illustrated in FIG. 1 is, for example, a device which is used in work of gripping, transporting, and assembling a target, such as an electronic component and an electronic device.

As illustrated in FIG. 1, the robot system 100 includes: a robot 1 including a robot arm 10; a fixed camera 2 (imaging portion) which is fixed in a work region 90 and has a capturing function; a mobile camera 3 (imaging portion) which is attached to the robot 1 and has a capturing function; and a control device 5 (calibration device) which controls each of the robot 1, the fixed camera 2, and the mobile camera 3.

In addition, in the embodiment, in the work region 90, a work stand 61 (assembly stand) on which the target is assembled, and a supply stand 62 to which the target is supplied by a worker, are provided. Each of the work stand 61 and the supply stand 62 is provided within a driving range of the robot arm 10 of the robot 1.

Hereinafter, each portion of the robot system 100 will be described in order.

Robot

The robot 1 illustrated in FIGS. 1 and 2 can perform the work of gripping, transporting, and assembling the target.

The robot 1 is a 6-axis vertical articulated robot, and includes a base 101, a robot arm 10 which is connected to the base 101, and a hand 102 (tool) which is provided at the tip end part of the robot arm 10. In addition, as illustrated in FIG. 3, the robot 1 includes a plurality of driving portions 130 and a plurality of motor drivers 120 which generate a driving force that drives the robot arm 10.

The base 101 is a part which attaches the robot 1 to a predetermined location in the work region 90.

The robot arm 10 includes a first arm 11 (arm), a second arm 12 (arm), a third arm 13 (arm), a fourth arm 14 (arm), a fifth arm 15 (arm), and a sixth arm 16 (arm). The first arm 11 is connected to the base 101, and the first arm 11, the second arm 12, the third arm 13, the fourth arm 14, the fifth arm 15, and the sixth arm 16 are linked to each other in order from the based end side to the tip end side.

As illustrated in FIG. 2, the first arm 11 includes a rotating axis member 111 linked to the base 101, and can rotate around a center axis of the rotating axis member 111 with respect to the base 101. In addition, the second arm 12 includes a rotating axis member 121 linked to the first arm 11, and can rotate around a center axis of the rotating axis member 121 with respect to the first arm 11. In addition, the third arm 13 includes a rotating axis member 131 linked to the second arm 12, and can rotate around a center axis of the rotating axis member 131 with respect to the second arm 12. In addition, the fourth arm 14 includes a rotating axis member 141 linked to the third arm 13, and can rotate around a center axis of the rotating axis member 141 with respect to the third arm 13. In addition, the fifth arm 15 includes a rotating axis member 151 linked to the fourth arm 14, and can rotate around a center axis of the rotating axis member 151 with respect to the fourth arm 14. In addition, the sixth arm 16 includes a rotating axis member 161 linked to the fifth arm 15, and can rotate around a center axis A6 of the rotating axis member 161 with respect to fifth arm 15. Here, a point (center of the tip end surface of the sixth arm 16) at which the center axis A6 and the tip end surface of the sixth arm 16 intersects each other is referred to as axial coordinates O6 (predetermined part).

The hand 102 is attached to the tip end surface of the sixth arm 16, and the center axis of the hand 102 matches the center axis A6 of the sixth arm 16. Here, the center of the tip end surface of the hand 102 is referred to as a tool center point (TCP). In the embodiment, the center is referred to as the center of a region between two fingers of the hand 102.

In addition, in each of the arms 11 to 16, the plurality of driving portions 130 including a motor, such as a servo motor, and a speed reducer, are respectively provided. In other words, as illustrated in FIG. 3, the robot 1 includes the driving portions 130 of which the number (six in the embodiment) corresponds to each of the arms 11 to 16. In addition, each of the arms 11 to 16 is respectively controlled by the control device 5 via the plurality (six in the embodiment) of motor drivers 120 which are electrically connected to the corresponding driving portion 130.

In addition, in each driving portion 130, for example, an angle sensor (not illustrated), such as an encoder or a rotary encoder, is provided. Accordingly, it is possible to detect the rotation angle of the rotating axis of the motor or the speed reducer of each driving portion 130.

In addition, as illustrated in FIGS. 1 and 2, in the embodiment, as a robot coordinate system (coordinate system of the robot 1) which is used when controlling the robot 1, a three-dimensional orthogonal coordinate system which is orthogonal to an xr axis and a yr axis which are respectively parallel to the horizontal direction, and the horizontal direction, and which is determined by an zr axis that considers the vertically upward direction as the forward direction, is set. In addition, a translational component with respect to the xr axis is "component xr", a translational component with respect to the yr axis is "component yr", a translational component with respect to the zr axis is "component zr", a rotational component around the zr axis is "component ur", a rotational component with respect to the yr axis is "component vr", and a rotational component with respect to the xr axis is "component wr". The unit of the length (size) of the component xr, the component yr, and the component zr, is "mm", and the unit of the angle (size) of the component ur, the component vr, and the component wr is "°".

Fixed Camera

The fixed camera 2 illustrated in FIGS. 1 and 2 has a function of capturing the target or the like.

As illustrated in FIG. 2, the fixed camera 2 includes an imaging element 21 which is configured of a charge coupled device (CCD) image sensor having a plurality of pixels; and a lens 22 (optical system). The fixed camera 2 forms an image of light from the target or the like on a light receiving surface 211 (sensor surface) of the imaging element 21 by the lens 22, converts the light into an electric signal, and outputs the electric signal to the control device 5. Here, the light receiving surface 211 is a front surface of the imaging element 21, and is a surface on which the light forms an image. In addition, in the embodiment, a position to which movement from the light receiving surface 211 is performed only by a focal length in the optical axis OA2 direction, is "imaging reference point O2 of the fixed camera 2".

The fixed camera 2 is fixed at the predetermined location in the work region 90 to be capable of capturing an upper part in the vertical direction. In addition, in the embodiment, the fixed camera 2 is attached so that the optical axis OA2 (the optical axis of the lens 22) is substantially parallel to the vertical direction.

In addition, in the embodiment, as an image coordinate system (coordinate system of the image output from the fixed camera 2) of the fixed camera 2, a two-dimensional orthogonal coordinate system which is determined by an xa axis and a ya axis that are respectively parallel to the in-plane direction of the image, is set. In addition, a translational component with respect to the xa axis is "component xa", a translational component with respect to the ya axis is "component ya", and a rotational component around a normal line of an xa-ya plane is "component ua". The unit of a length (size) of the component xa and the component ya is "pixel", and the unit of an angle (size) of the component ua is "°".

In addition, the image coordinate system of the fixed camera 2 is a two-dimensional orthogonal coordinate system which nonlinearly converts the three-dimensional orthogonal coordinate that is given to a camera viewing field of the fixed camera 2 by adding optical properties (focal length, distortion, or the like) of the lens 22 and the number of pixels and the size of the imaging element 21.

Mobile Camera

The mobile camera 3 illustrated in FIGS. 1 and 2 has a function of capturing the target or the like.

As illustrated in FIG. 2, the mobile camera 3 includes an imaging element 31 which is configured of a charge coupled device (CCD) image sensor having a plurality of pixels; and a lens 32 (optical system). The mobile camera 3 forms an image of light from the target or the like on a light receiving surface 311 (sensor surface) of the imaging element 31 by the lens 32, converts the light into an electric signal, and outputs the electric signal to the control device 5. Here, the light receiving surface 311 is a front surface of the imaging element 31, and is a surface on which the light forms an image. In addition, in the embodiment, a position to which movement from the light receiving surface 311 is performed only by a focal length in the optical axis OA3 direction, is "imaging reference point O3 of the mobile camera 3".

The mobile camera 3 is attached to the sixth arm 16 so as to be capable of capturing the tip end side of the robot arm 10 rather than the sixth arm 16. In addition, in the embodiment, on the design, the mobile camera 3 is attached to the sixth arm 16 so that the optical axis OA3 (optical axis of the lens 32) is substantially parallel to the center axis A6 of the sixth arm 16. In addition, since the mobile camera 3 is attached to the sixth arm 16, it is possible to change the posture thereof together with the sixth arm 16 by driving the robot arm 10.

In addition, in the embodiment, as the image coordinate system (coordinate system of the image output from the mobile camera 3) of the mobile camera 3, a two-dimensional orthogonal coordinate system which is determined by an xb axis and a yb axis that are respectively parallel to the in-plane direction of the image. In addition, a translational component with respect to the xb axis is "component xb", a translational component with respect to the yb axis is "component yb", and a rotational component around a normal line of an xb-yb plane is "component ub". The unit of a length (size) of the component xb and the component yb is "pixel", and the unit of an angle (size) of the component ub is "°".

In addition, the image coordinate system of the mobile camera 3 is a two-dimensional orthogonal coordinate system which nonlinearly converts the three-dimensional orthogonal coordinate that is given to a camera viewing field of the mobile camera 3 by adding optical properties (focal length, distortion, or the like) of the lens 32 and the number of pixels and the size of the imaging element 31.

Control Device

The control device 5 illustrated in FIG. 1 controls each portion of the robot 1, the fixed camera 2, and the mobile camera 3. The control device 5 can be configured of a personal computer (PC) or the like in which a central processing unit (CPU), a read only memory (ROM), and a random access memory (RAM) are embedded.

As illustrated in FIG. 3, the control device 5 includes a driving control portion 51, an information obtaining portion 52, a processing portion 53, and a storage portion 54.

The driving control portion 51 can control the driving of each driving portion 130 across the driving of each of the arms 11 to 16 of the robot 1, and can drive and stop each of the arms 11 to 16 independently. For example, in order to move the hand 102 to a target position, the driving control portion 51 derives a target value of the motor of each driving portion 130 provided in each of the arms 11 to 16. In addition, the driving control portion 51 feedback-controls the robot 1 based on the rotation angle (detection result) output from the angle sensor of each driving portion 130. In addition, the driving control portion 51 controls the capturing or the like of the fixed camera 2 and the mobile camera 3.

The information obtaining portion 52 obtains the detection result output from each of the robot 1, the fixed camera 2, and the mobile camera 3. Examples of the detection result include the rotation angle of the rotating axis of the motor or the speed reducer of each driving portion 130 of the robot 1, the image captured by each of the fixed camera 2 and the mobile camera 3, and the coordinates (components xr, yr, zr, ur, vr, and wr: the position and the posture) of the axial coordinates O6 in the robot coordinate system.

The processing portion 53 performs processing, such as various types of calculation or various types of determination based on the detection result obtained by the information obtaining portion 52. For example, the processing portion 53 calculates the coordinates (components xa, ya, and ua: the position and the posture) of the capturing target in the image coordinate system of the fixed camera 2 based on the image captured by the fixed camera 2, and calculates the coordinates (components xb, yb, and ub: the position and the posture) of the capturing target in the image coordinate system of the mobile camera 3 based on the image captured by the mobile camera 3. In addition, for example, the processing portion acquires the correction parameter for converting the coordinate of the target in the image coordinate system of the fixed camera 2 into the coordinate in the robot coordinate system, and acquires the correction parameter for converting the coordinate of the target in the image coordinate system of the mobile camera 3 into the coordinate in the robot coordinate system.

The storage portion 54 stores a program or data for performing various types of processing by the control device 5, and the storage portion 54 stores various detection results.

In addition, as illustrated in FIGS. 1 and 3, display equipment 41 and operation equipment 42 are connected to the control device 5.

The display equipment 41 includes a monitor 411 which is configured of a display panel, such as a liquid crystal display panel. The worker can confirm the image captured by the fixed camera 2 and the mobile camera 3 and the work or the like by the robot 1, via the monitor 411.

The operation equipment 42 is an input device which is configured of a keyboard, and outputs an operation signal which corresponds to the operation by the worker to the control device 5. Therefore, the worker can instruct various types of processing or the like to the control device 5 by operating the operation equipment 42.

Hereinafter, a basic configuration of the robot system 100 will be briefly described.

In the robot system 100 having the configuration, for example, it is possible to perform the following work.

First, by the control of the control device 5, the robot arm 10 is driven and the target is gripped by the hand 102. After this, the robot arm 10 is driven and the hand 102 is moved onto the fixed camera 2. Next, by capturing the target by the fixed camera 2, based on the image captured by the fixed camera 2, the control device 5 determines whether or not the target is accurately gripped by the hand 102. When accurately gripping the target, the hand 102 is moved on the work stand 61 by driving the robot arm 10. In addition, based on the image captured by the mobile camera 3, the target gripped by the hand 102 is assembled to the target which is disposed on the work stand 61 in advance.

In the above-described work, based on the image of the target captured by each of the fixed camera 2 and the mobile camera 3, the robot 1 performs the work with respect to the target.

In the work, in order to allow the robot 1 to accurately perform the work with respect to the target based on the image captured by the fixed camera 2, it is necessary to perform processing of acquiring the correction parameter for converting the coordinate (the position and the posture in the image coordinate system) on the image of the fixed camera 2 into the coordinate in the robot coordinate system, that is, the calibration of the fixed camera 2. In addition, similarly, in order to allow the robot 1 to accurately perform the work with respect to the target or the like based on the image captured by the mobile camera 3, it is necessary to perform processing of acquiring the correction parameter for converting the coordinate (the position and the posture in the image coordinate system) on the image of the mobile camera 3 into the coordinate in the robot coordinate system, that is, the calibration of the mobile camera 3.

Hereinafter, a calibration method of the fixed camera 2 and a calibration method of the mobile camera 3 (hereinafter, both of the methods are referred to as "calibration method of the imaging portion") which use the robot system 100, will be described.

Calibration Method of Imaging Portion

Figure 4:
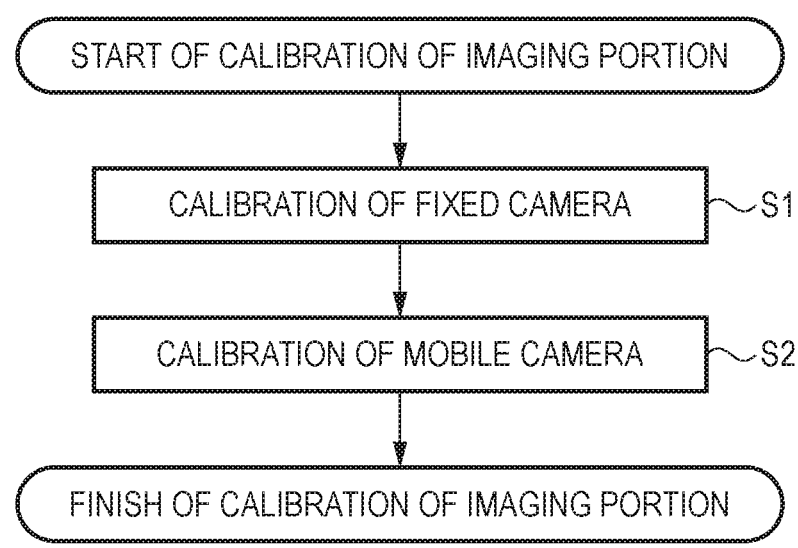
FIG. 4 is a flowchart illustrating a calibration method of an imaging portion which uses the robot system illustrated in FIG. 1.
Figure 5:
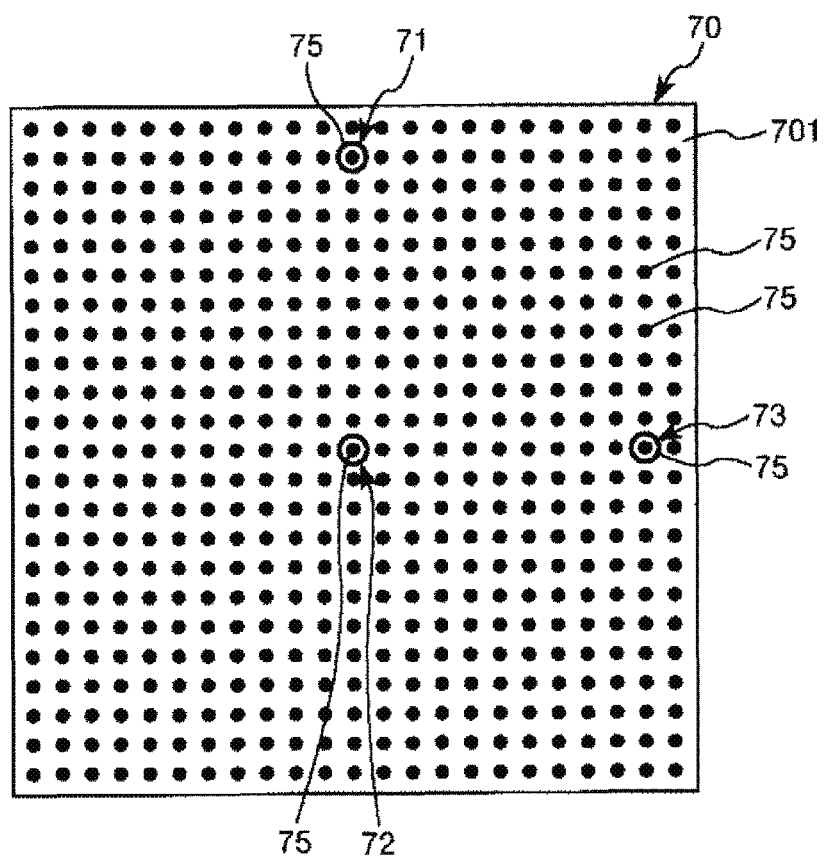
FIG. 5 is a plan view of a calibration member which is used in calibrating the imaging portion illustrated in FIG. 4.
Figure 6:
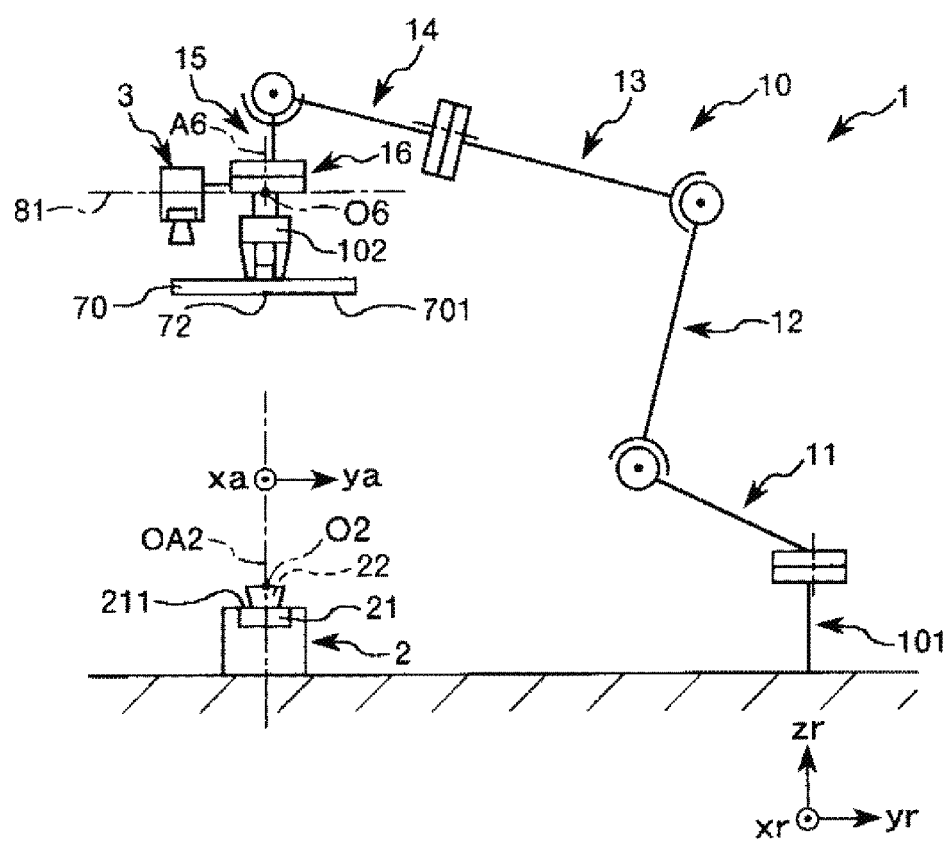
FIG. 6 is a schematic view of the robot for illustrating calibration of a fixed camera illustrated in FIG. 4.
Figure 7:
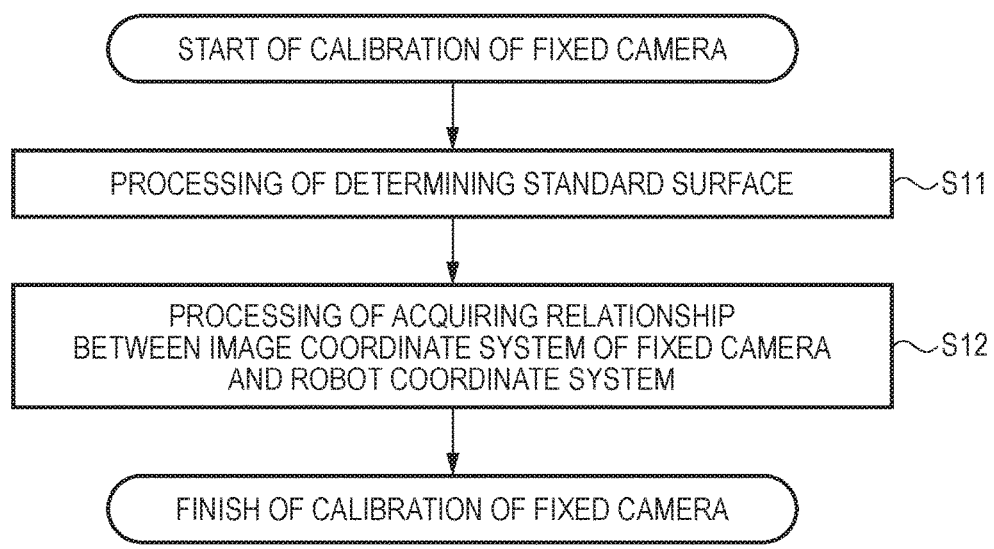
FIG. 7 is a flowchart illustrating the calibration of the fixed camera illustrated in FIG. 4.
Figure 8:
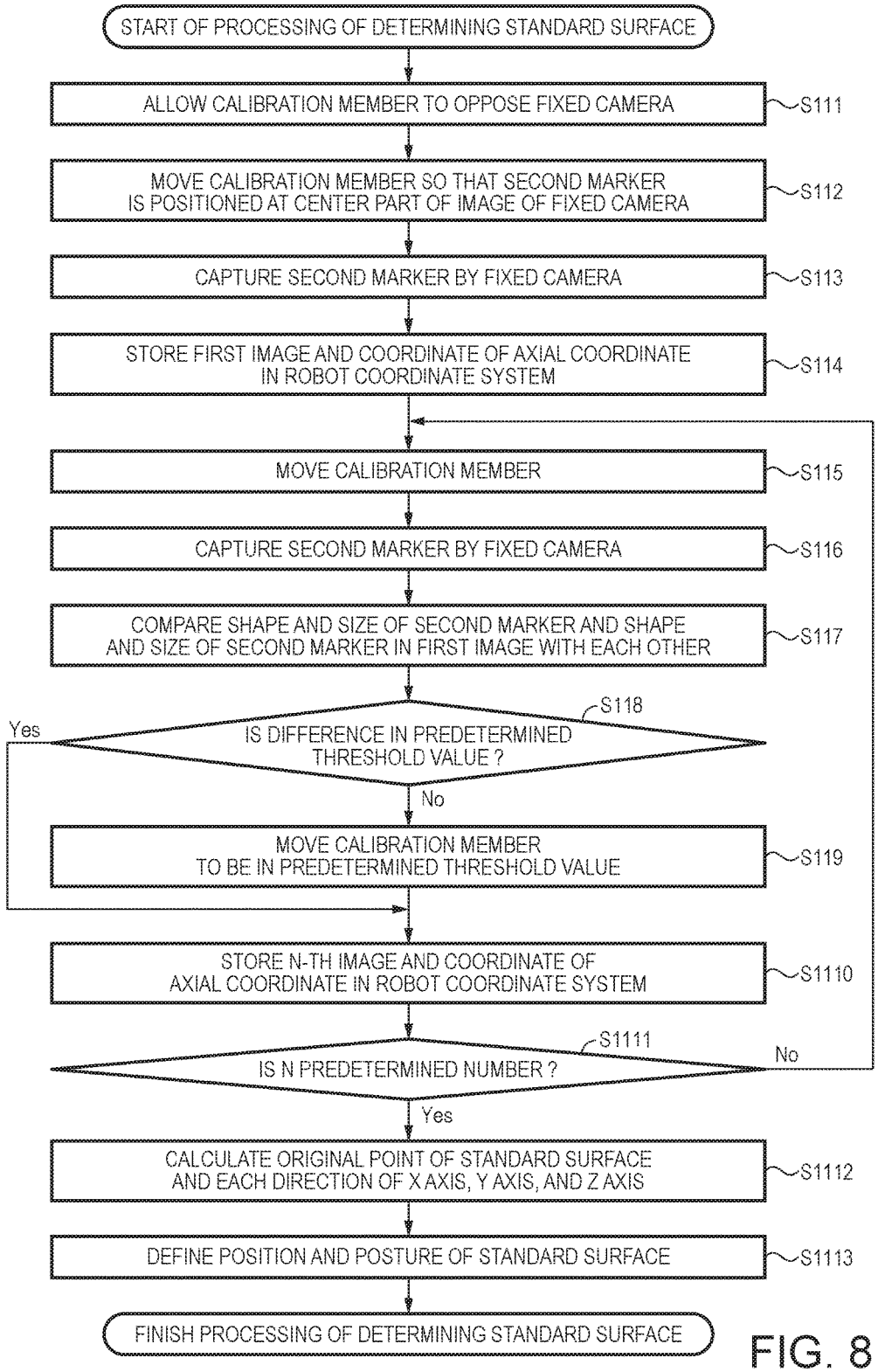
FIG. 8 is a flowchart illustrating processing of determining a reference surface illustrated in FIG. 7.
Figure 9:
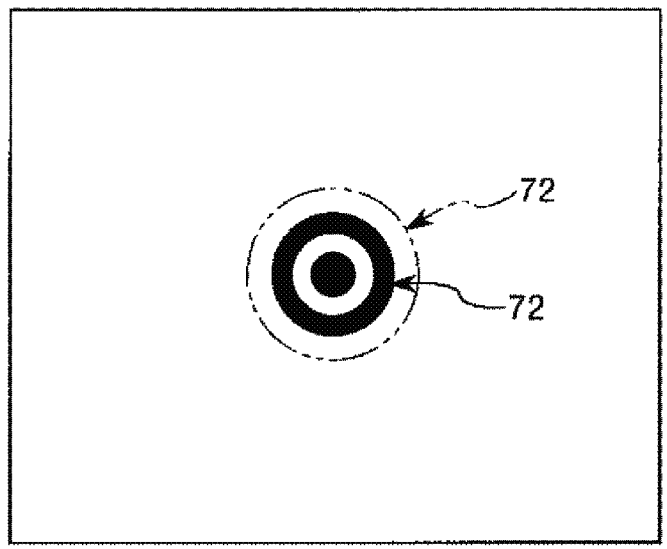
FIG. 9 is a view illustrating comparison of a first marker with an n-th marker in the processing of determining the reference surface illustrated in FIG. 8.
Figure 10:
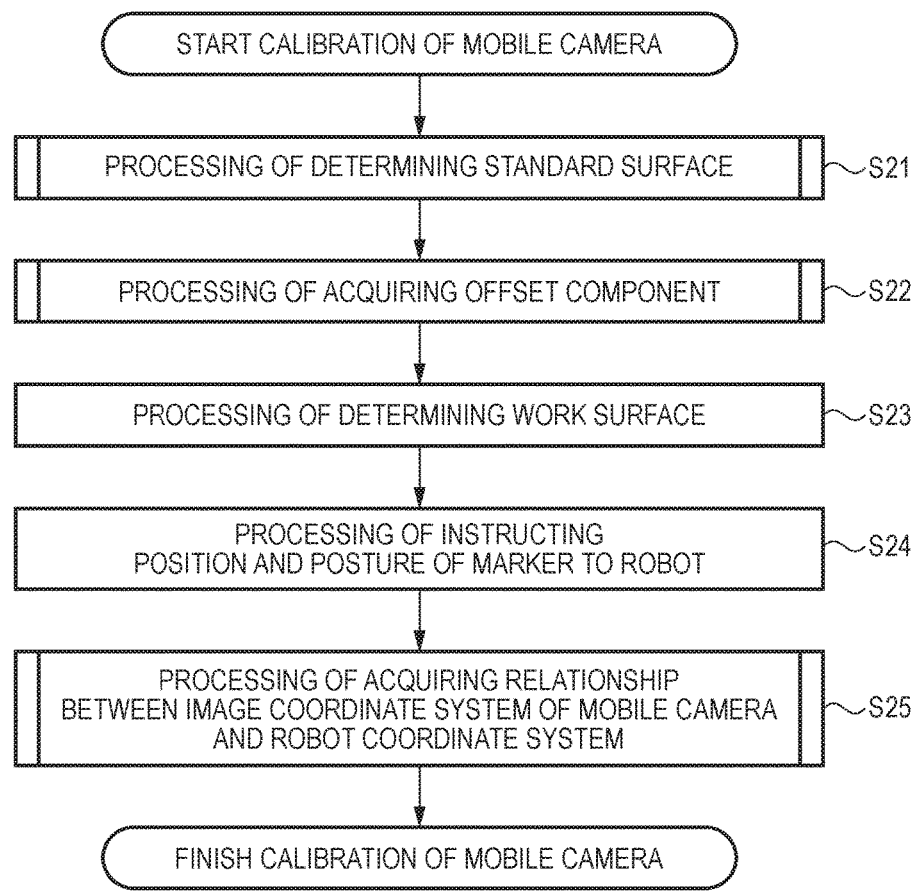
FIG. 10 is a flowchart illustrating the calibration of a mobile camera illustrated in FIG. 4.
Figure 11:
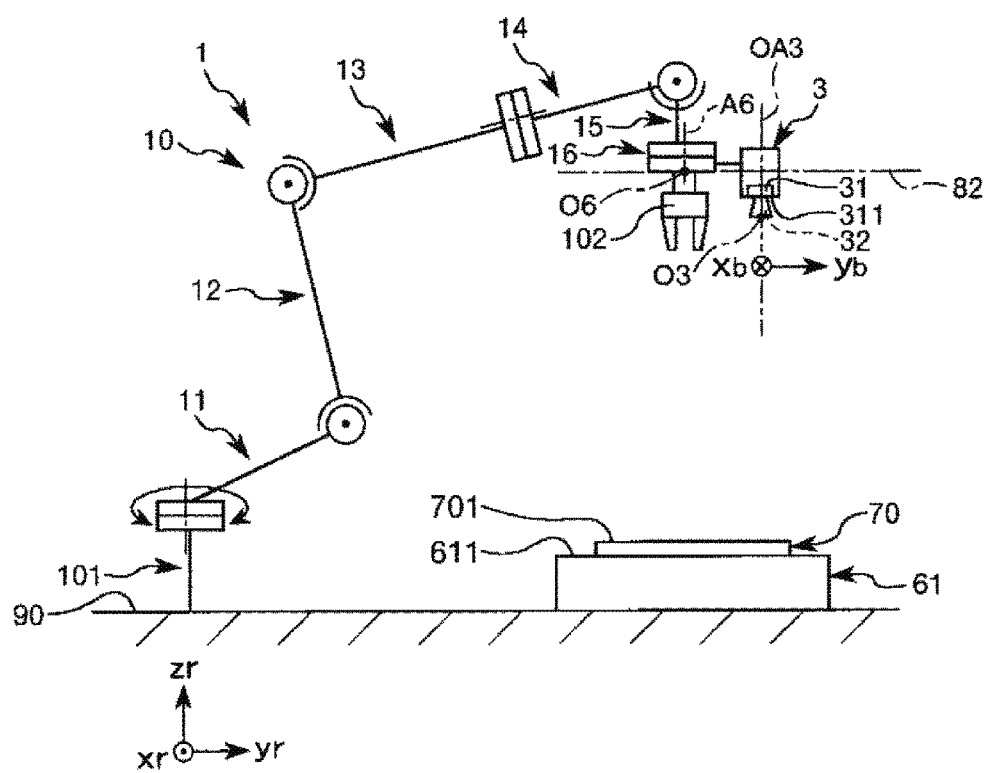
FIG. 11 is a schematic view of the robot illustrating the calibration of the mobile camera illustrated in FIG. 10.
Figure 12:
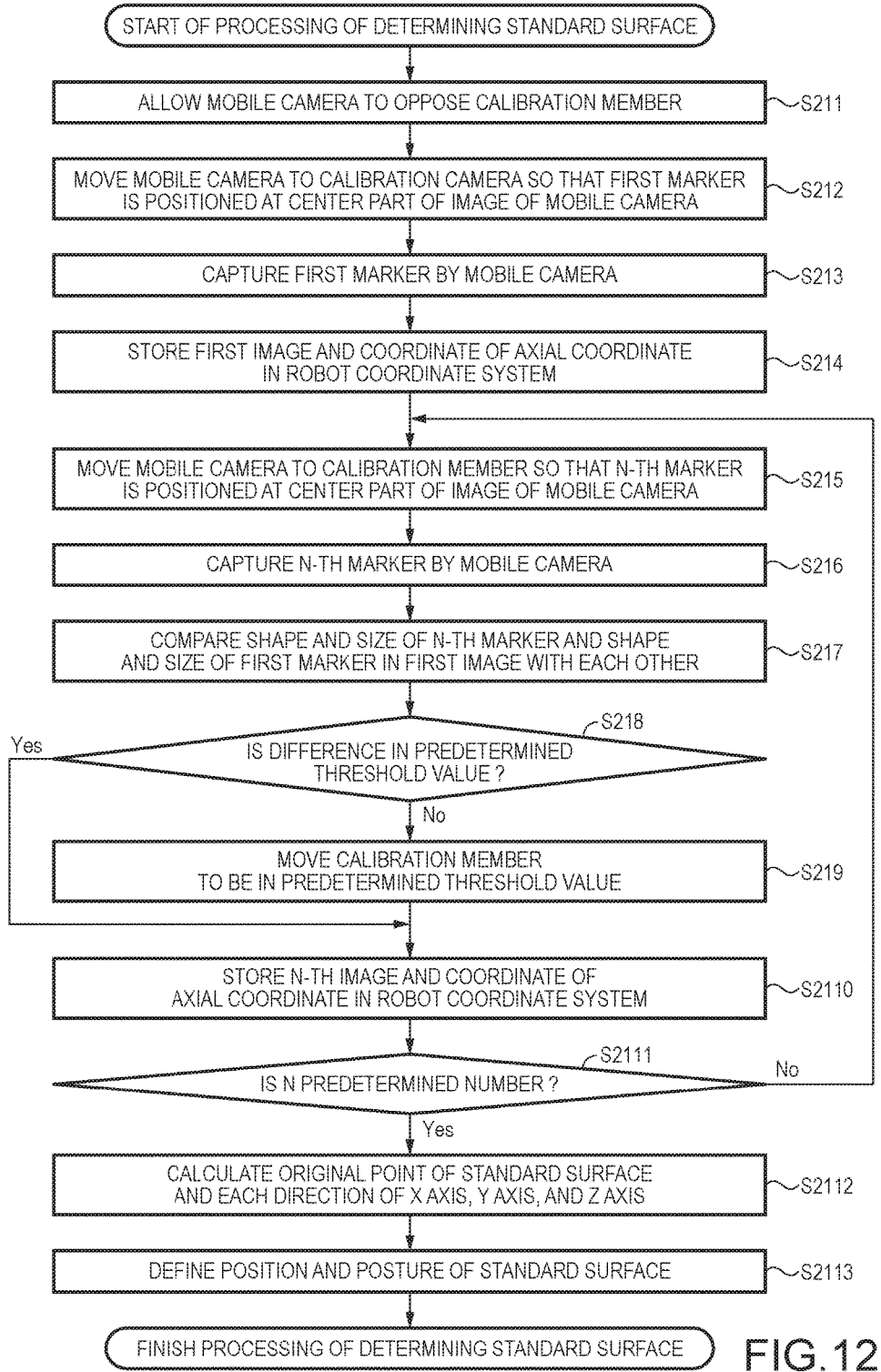
FIG. 12 is a flowchart illustrating the processing of determining the reference surface illustrated in FIG. 10.
Figure 13:
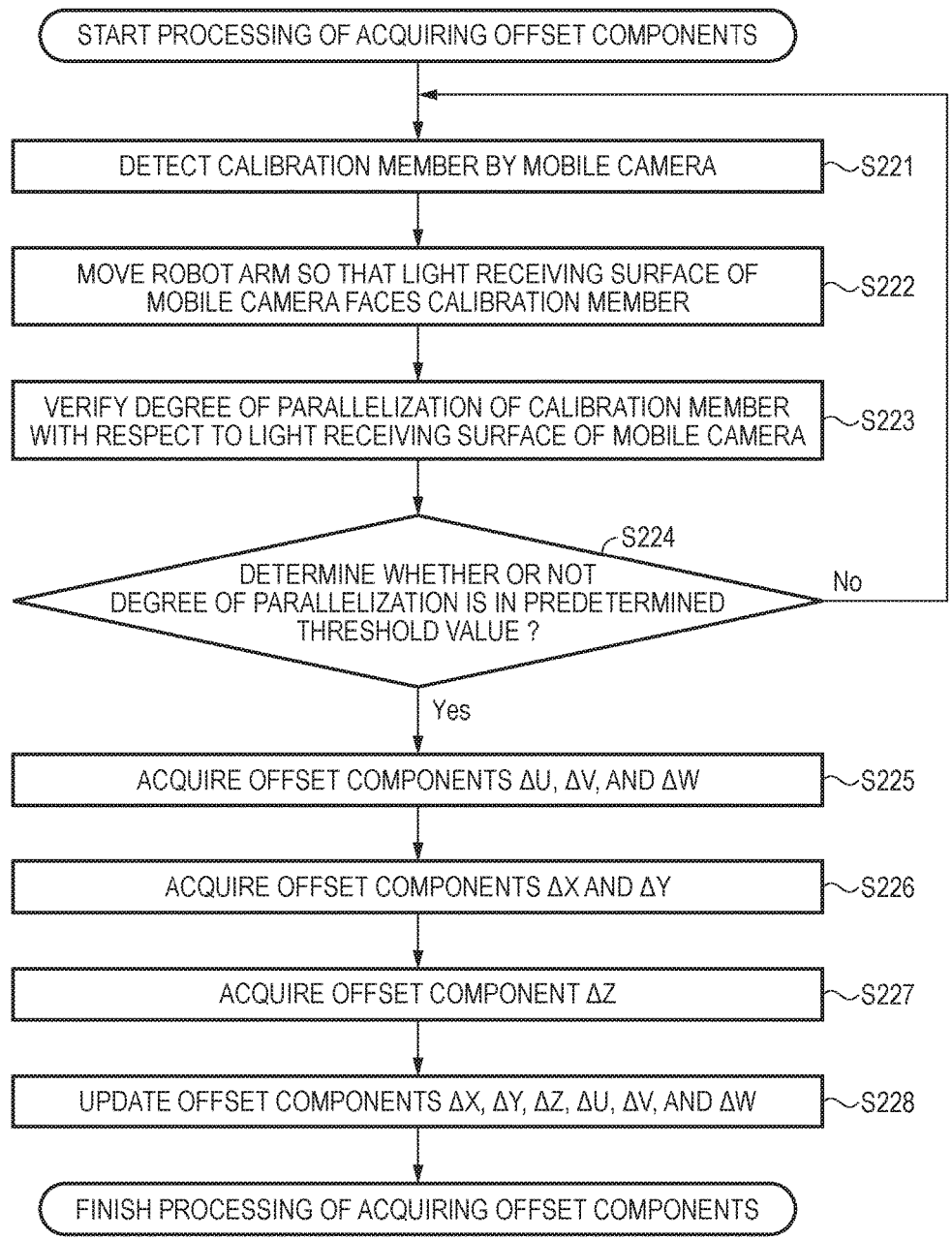
FIG. 13 is a flowchart illustrating processing of acquiring offset components illustrated in FIG. 10.
Figure 14:
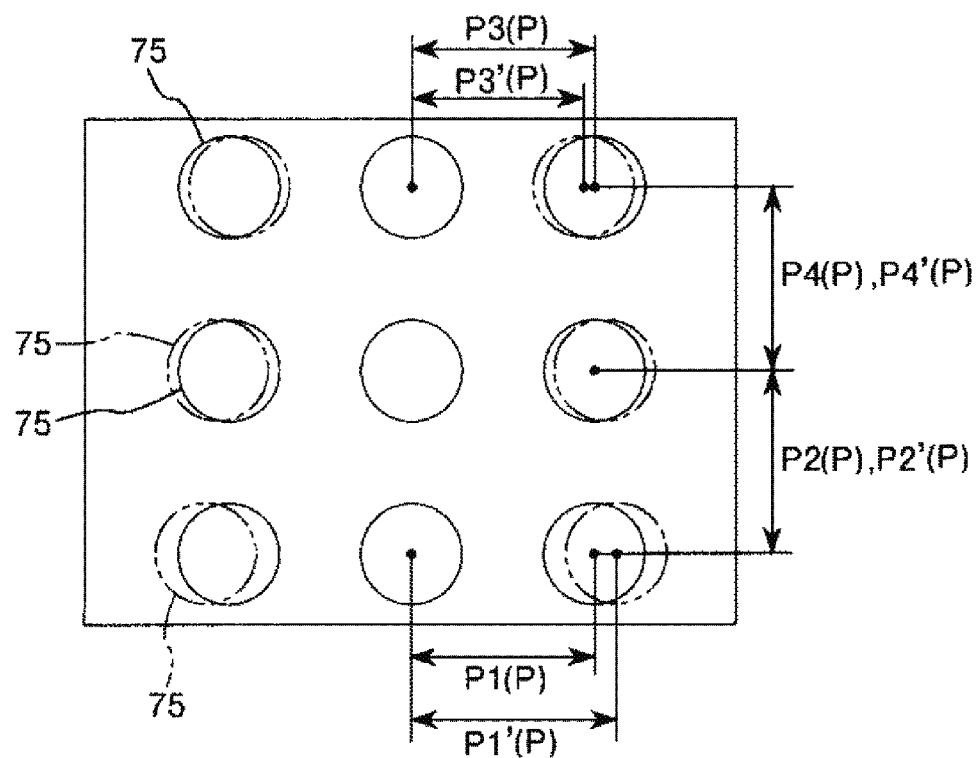
FIG. 14 is a view illustrating processing of acquiring offset components Δu, Δv, and Δw illustrated in FIG. 13.
Figure 20:
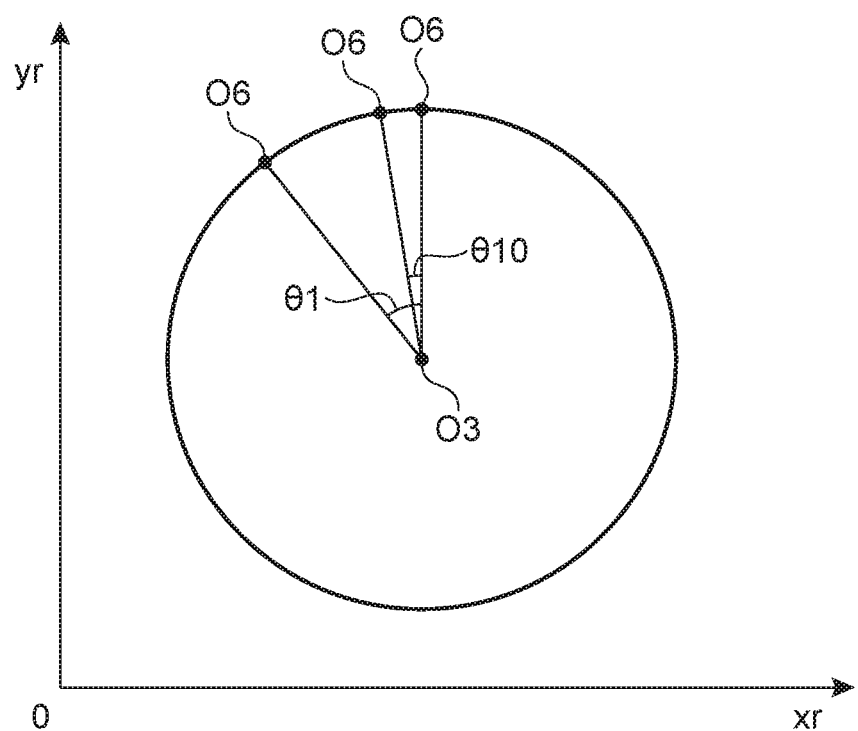
FIG. 20 is a coordinate view illustrating the processing of acquiring the offset components Δx and Δy illustrated in FIG. 13.
Figure 21:
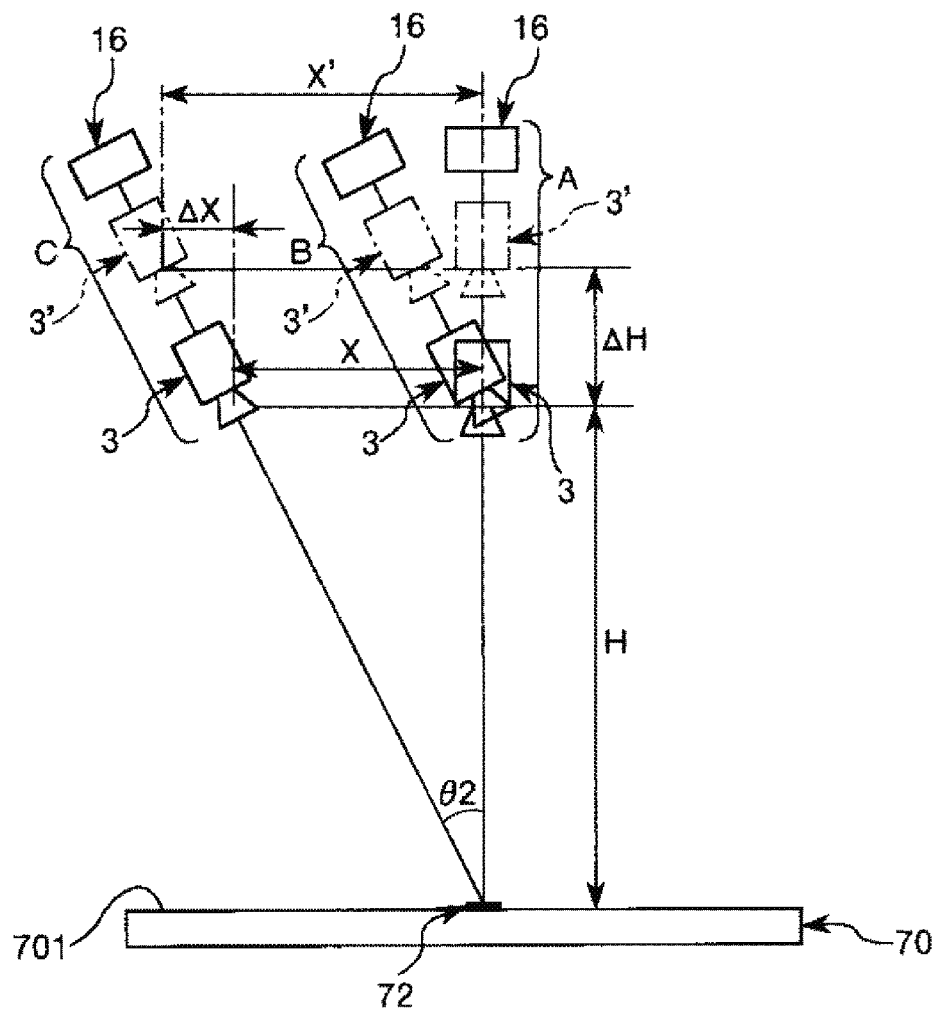
FIG. 21 is a view illustrating processing of acquiring an offset component Δz illustrated in FIG. 13.

FIG. 4 is a flowchart illustrating a calibration method of the imaging portion which uses the robot system illustrated in FIG. 1. FIG. 5 is a plan view of the calibration member which is used in calibrating the imaging portion illustrated in FIG. 4. FIG. 6 is a schematic view of the robot for illustrating the calibration of the fixed camera illustrated in FIG. 4. FIG. 7 is a flowchart illustrating the calibration of the fixed camera illustrated in FIG. 4. FIG. 8 is a flowchart illustrating processing of determining a reference surface illustrated in FIG. 7. FIG. 9 is a view illustrating comparison of a first marker with an n-th marker in the processing of determining the reference surface illustrated in FIG. 8. FIG. 10 is a flowchart illustrating the calibration of the mobile camera illustrated in FIG. 4. FIG. 11 is a schematic view of the robot illustrating the calibration of the mobile camera illustrated in FIG. 10. FIG. 12 is a flowchart illustrating the processing of determining the reference surface illustrated in 10. FIG. 13 is a flowchart illustrating processing of acquiring offset components illustrated in FIG. 10. FIG. 14 is a view illustrating processing of acquiring offset components Δu, Δv, and Δw illustrated in FIG. 13. FIGS. 15, 16, 17, 18, and 19 are views illustrating processing of acquiring offset components Δx and Δy illustrated in FIG. 13. FIG. 20 is a coordinate view illustrating the processing of acquiring the offset components Δx and Δy illustrated in FIG. 13. FIG. 21 is a view illustrating processing of acquiring an offset component Δz illustrated in FIG. 13.

As illustrated in FIG. 4, in the calibration method of the imaging portion of the embodiment, after performing the calibration (step S1) of the fixed camera 2, the calibration (step S2) of the mobile camera 3 is performed.

The calibration of the imaging portion is started as the worker instructs the start of the calibration of the imaging portion to the control device 5 by using the operation equipment 42. In addition, when the worker instructs the start of the calibration of the imaging portion to the control device 5, after this, the calibration of the imaging portion is automatically performed by the robot system 100. In addition, the calibration of the imaging portion is performed, for example, by changing the contents or the like of the work of the robot 1.

Here, in the embodiment, the calibration of the imaging portion is performed by using a calibration member 70 (calibration board) illustrated in FIG. 5.

The calibration member 70 is a member having a shape of a quadrangle flat plate, and a plurality of markers 75 are attached to a front surface 701 of the calibration member 70. The plurality of markers 75 have the same circular shape and have substantially the same size. In addition, the plurality of markers 75 are disposed so that all of the pitches (intervals) between the adjacent markers 75 are substantially constant. In addition, the pitches between the markers 75 are predicted in advance and is known.

Circles which surround the markers 75 are further respectively attached to each of the marker 75 which is positioned on an upper side in FIG. 5, the marker 75 which is positioned at the center part (center part of the front surface 701) in FIG. 5, and the marker 75 which is positioned on a right side in FIG. 5 among the markers 75. Among the three markers 75 and the markers which have a concentric circular shape configured of a circle which surrounds the three markers 75, the marker which is positioned on the upper side in FIG. 5 is "first marker 71 (first reference point)", the marker which is positioned at the center part in FIG. 5 is "second marker (second reference point)", and the marker which is positioned on the right side in FIG. 5 is "third marker 73 (third reference point)". The first marker 71, the second marker 72, and the third marker 73 are used as the reference markers in the processing (refer to FIG. 7) of determining the reference surface of the calibration of the imaging portion which will be described later. Therefore, the positions of the first marker 71, the second marker 72, and the third marker 73 are different from each other, and the first marker 71, the second marker 72, and the third marker 73 are not on the same straight line.

In addition, the shapes of the plurality of markers 75, the first marker 71, the second marker 72, and the third marker 73 may respectively be any shape not being limited to the shape illustrated in the drawing. In addition, the marker 75, the first marker 71, the second marker 72, and the third marker 73 may be an aspect which can be visually recognized, may be in any color, and may be an aspect having unevenness, respectively. In addition, the aspects of the plurality of markers 75, the first marker 71, the second marker 72 and the third marker 73 may be different from each other. For example, the plurality of markers 75, the first marker 71, the second marker 72, and the third marker 73 may respectively be in any color or shape. However, since the first marker 71, the second marker 72, and the third marker 73 are used as the reference markers, it is preferable that the first marker 71, the second marker 72, and the third marker 73 are discerned from other markers 75.

As illustrated in FIG. 6, before the worker instructs the start of the calibration of the imaging portion, the calibration member 70 having the configuration is gripped by the hand 102 in the robot 1 in advance. In addition, in the embodiment, in order to position the second marker 72 on the center axis A6 of the sixth arm 16, the calibration member 70 is gripped by the hand 102. In addition, in the embodiment, the coordinate of the second marker 72 with respect to the coordinate of the axial coordinates O6 in the robot coordinate system is determined, and it is possible to acquire the coordinate of the second marker 72 in the robot coordinate system.

In addition, in the embodiment, as described above, the second marker 72 is positioned on the center axis A6 of the sixth arm 16, but when it is set to be capable of acquiring the coordinate of the second marker 72 in the robot coordinate system, the second marker 72 may not be positioned on the center axis A6 of the sixth arm 16.

Calibration of Fixed Camera (Step S1)

As illustrated in FIG. 4, when the start of the calibration of the imaging portion is instructed by the worker, first, the control device 5 starts the calibration (step S1) of the fixed camera 2.

As illustrated in FIG. 7, in the calibration of the fixed camera 2 (step S1), after performing the processing of determining the reference surface (step S11), the processing of acquiring the relationship between the image coordinate system of the fixed camera 2 and the robot coordinate system (step S12) is performed.

Processing of Determining Reference Surface (Step S11)

Hereinafter, the processing (step S11) of determining the reference surface will be described with reference to the flowchart illustrated in FIG. 8.

As illustrated in FIG. 8, when the processing of determining the reference surface (step S11) is started, first, the control device 5 drives the robot arm 10, and as illustrated in FIG. 6, the calibration member 70 opposes the fixed camera (step S111).

Next, as illustrated in FIG. 8, the control device 5 drives the robot arm 10, and moves the calibration member 70 so that the second marker 72 attached to the calibration member 70 is positioned at the center part of the image of the fixed camera 2 (step S112).

Next, the control device 5 captures the second marker 72 by the fixed camera 2 (step S113). At this time, the control device 5 performs the processing (focusing processing) of moving the calibration member 70 by driving the robot arm 10 so that a focal point of the fixed camera 2 is adjusted (focused) to second marker 72. In addition, the focusing processing may be omitted.

Next, the control device 5 stores the image of the second marker 72 captured by the fixed camera 2 in the storage portion 54 as "first image", and the coordinate of the axial coordinates O6 in the robot coordinate system when the first image is captured is stored in the storage portion 54 (step S114). Here, in the processing of determining the reference surface in the fixed camera 2 (step S11), the second marker 72 when the first image is captured is "first reference marker".

Next, the control device 5 drives the robot arm 10, and translationally moves the calibration member 70 along the xr axis, the yr axis, and the zr axis in the robot coordinate system so that the second marker 72 is positioned at a position different from the position to which the second marker 72 is moved in step S112 on the image of the fixed camera 2 (step S115).

Next, the control device 5 captures the second marker 72 by the fixed camera 2 (step S116).

Next, the shape and the size of the second marker 72 in the image captured by the fixed camera 2 in step S116, and the shape and the size of the second marker 72 in the first image stored in the storage portion 54 in step S114, are compared with each other (step S117). In addition, it is determined whether or not a difference between the shape and the size of the second marker 72, and the shape and the size of the second marker 72 in the first image, is in a predetermined threshold value (step S118).

In a case where it is determined that the difference is in the predetermined threshold value ("YES" in step S118), the process moves to step S1110. Meanwhile, in a case where it is determined that the difference is not in the predetermined threshold value ("NO" in step S118), the calibration member 70 is moved by the driving of the robot arm 10 to be in the predetermined threshold value (step S119). For example, as illustrated in FIG. 9, the size (outer shape) of the second marker 72 illustrated by a two-dot chain line in FIG. 9 is different from the size (outer shape) of the second marker 72 in the first image illustrated by a solid line in FIG. 9, and in a case where the difference in the size is not in the predetermined threshold value, the calibration member 70 is moved by the driving of the robot arm 10 so that the difference is in the predetermined threshold value.

Next, when it is determined that the difference in the predetermined threshold value, the control device 5 stores the image of the second marker 72 captured by the fixed camera 2 in the storage portion 54 as "second image (n-the image)", and stores the coordinate of the axial coordinates O6 in the robot coordinate system when the second image (n-th image) is captured in the storage portion 54 (step S1110). Here, in the processing of determining the reference surface in the fixed camera 2 (step S11), the second marker 72 when the second image is captured is "second reference marker". In addition, when capturing the second image, the second marker 72 attached to the calibration member 70 gripped by the hand 102 is at a position different from the position when capturing the first image.

Next, it is determined whether or not the number n of the captured images is the number predetermined in advance (here, n is an integral number, and is the number which satisfies the relationship of 3≤n) (step S1111). In a case where it is determined that the number is the predetermined number, the process moves to step S1112, and in a case where it is determined that the number is less than the predetermined number, the above-described step S115 to step S1110 are repeated until it is determined that the number is the predetermined number.

Here, in the embodiment, when the image is obtained until the number of the images becomes 3, that is, it is set to capture three images (first image, second image, and third image) by the fixed camera 2 in advance. Therefore, in the embodiment, after capturing the second image by the fixed camera 2, step S115 to step S1110 are performed one more time, the calibration member 70 is driven by the driving of the robot arm 10, the image of the second marker 72 captured by the fixed camera 2 is stored in the storage portion 54 as "third image", and the coordinate of the axial coordinates O6 in the robot coordinate system when the third image is captured is stored in the storage portion 54. Here, in the processing (step S11) of determining the reference surface in the fixed camera 2, the second marker 72 when the third image is captured is "third reference marker". In addition, when capturing the third image, the second marker 72 attached to the calibration member 70 gripped by the hand 102 is at a position different from the position when capturing the first image and the position when capturing the second image, and is not on the same straight line. In addition, in the processing of determining the reference surface in the fixed camera 2 (step S11), it can be ascertained that the second marker 72 serves as "the first reference marker, the second reference marker, and the third reference marker".

Next, when it is determined that the number n of images is the predetermined number, based on the coordinate of the axial coordinates O6 in n (three in the embodiment) robot coordinate systems stored in the storage portion 54, the processing portion 53 acquires an origin point of a reference surface 81 parallel to the imaging element 21 (a plane which passes through the second markers 72 which are in a state of being disposed at three different locations) illustrated in FIG. 6, and each direction of the x axis, the y axis, and the z axis (step s1112). In addition, the control device 5 defines the position and the posture of the reference surface 81 in the robot coordinate system, that is, the components xr, yr, zr, ur, vr, and wr of the reference surface 81 (step S1113).

Above, the processing (step S11) of determining the reference surface illustrated in FIG. 7 is finished.

As described above, according to the control device 5, it is possible to acquire the posture of the reference surface 81 based on the images (the first image, the second image, and the third image) captured by the fixed camera 2 (imaging portion). Therefore, similar to in the related art, it is possible to omit the work of determining a contact state between a touch-up hand and a calibration tool (calibration member) by the worker. Therefore, it is possible to reduce variation caused by a human error or variation caused by the worker, and accordingly, it is possible to acquire the posture of the reference surface 81 with high accuracy. In addition, when the reference surface is acquired by bringing the touch-up hand into contact with the calibration tool similar to in the related art, the posture of the acquired reference surface varies according to the material or the like of the calibration tool, and it is difficult to detect the posture of the reference surface with high accuracy. Meanwhile, in the embodiment, since the posture of the reference surface 81 is acquired based on the image captured by the fixed camera 2, it is possible to acquire the posture of the reference surface 81 without coming into contact with the calibration member 70 (in a non-contact state). Therefore, for example, it is possible to acquire the posture of the reference surface 81 with high accuracy regardless of the material or the like of the calibration member 70.

In addition, according to the control device 5, since it is possible to acquire the posture of the reference surface 81 based on the image captured by the fixed camera 2, it is possible to more easily and rapidly acquire the posture of the reference surface 81 than the related art.

In addition, as described above, in the embodiment, the reference surface 81 is acquired based on the coordinate of the axial coordinates O6 (predetermined part) in the robot coordinate system when each of the three images (the first image, the second image, and the third image) are respectively captured. Therefore, it can be said that the reference surface 81 is a surface including the axial coordinates O6. Therefore, as the robot 1 performs the work (for example, the work of determining whether or not the target is accurately gripped by the hand 102) on the reference surface 81, the robot 1 can accurately perform the work.

In particular, as described above, in the embodiment, when capturing the three images, by performing the focusing processing, when the robot 1 performs each work of detecting, investigating, and assembling the target on the reference surface 81, the robot 1 can perform various types of work with higher accuracy.

In addition, when the distance between the axial coordinates O6 and a tool center point TCP is known in advance, it is possible to acquire the surface including the tool center point TCP based on the distance and the reference surface 81 which is the surface including the axial coordinates O6.

In addition, in the embodiment, the processing of determining the reference surface 81 based on the coordinate of the axial coordinates O6 (step S11) is performed, but the reference surface 81 may be determined based on the coordinate of the tool center point TCP, and the reference surface 81 may be determined based on another arbitrary part of the robot.

In addition, as described above, in the embodiment, based on the size of the second marker 72 in the first image, the size of the second marker 72 in the second image, and the size of the second marker 72 in the third image, the position and the posture of the reference surface 81 are acquired. Therefore, in the embodiment, when the position and the posture of the reference surface 81 are acquired based on the size of the second marker 72 in each image, it is possible to accurately acquire the posture of the reference surface 81.

In addition, the acquiring of the position and the posture of the reference surface 81 based on the size of the second marker 72 in each image, is the same as the acquiring of the posture of the reference surface 81, based on a distance (first distance) between the second marker 72 when the first image is obtained and the light receiving surface 211 (more specifically, imaging reference point O2) of the fixed camera 2, a distance (second distance) between the second marker 72 when the second image is obtained and the light receiving surface 211 (imaging reference point O2), and a distance (third distance) between the second marker 72 when the third image is obtained and the light receiving surface 211 (imaging reference point O2). Therefore, according to the calibration method of the embodiment, it is possible to acquire the posture of the reference surface 81 based on the distance of the first distance, the second distance, and the third distance.

Processing of Acquiring Relationship Between Image Coordinate System of Fixed Camera and Robot Coordinate System (Step S12)

Next, as illustrated in FIG. 7, the processing of acquiring the relationship between the image coordinate system of the fixed camera and the robot coordinate system (step S12) will be described.

First, the control device 5 drives the robot arm 10, and moves the calibration member 70 so that each of the axial coordinates O6 is positioned at nine arbitrary reference points (virtual target points) which are arranged in a shape of lattice in the reference surface 81 acquired in the above-described step S12. In other words, the second marker 72 is moved to nine locations arranged in a shape of lattice. At this time, the control device 5 captures the second marker 72 by the fixed camera 2 by moving the calibration member 70.

Here, all of the nine reference points are within a range (within an imaging region) of the image of the fixed camera 2, and all of the intervals between the reference points adjacent to each other are equivalent to each other.

Next, based on the coordinates (components xa, ya, and ua) of the second marker 72 in the image coordinate system of the fixed camera 2 based on the nine images, and the coordinates (components xr, yr, and ur) of the reference surface 81 in the robot coordinate system acquired in the above-described step S11, the control device 5 acquires the correction parameter (transformation matrix) which converts the image coordinate of the fixed camera 2 into the coordinate of the reference surface 81 in the robot coordinate system.

When the correction parameter acquired in this manner is used, it is possible to convert the position and the posture (specifically, components xa, ya, and ua) of the target or the like captured by the fixed camera 2 into a value (specifically, components xr, yr, and ur) in the robot coordinate system. In addition, the correction parameter is a value to which an inner parameter of the fixed camera 2, such as distortion of the lens 22, is added.

In addition, in the embodiment, as described above, the correction parameter is acquired by using the nine reference points, but the accuracy of the calibration increases as the number of reference points used for acquiring the correction parameter increases.

Above, the calibration of the fixed camera illustrated in FIG. 4 (step S1) is finished.

Calibration of Mobile Camera (Step S2)

Next, the control device 5 starts the calibration of the mobile camera 3 (step S2) illustrated in FIG. 4.

As illustrated in FIG. 10, in the calibration of the mobile camera 3 (step S2), processing of determining the reference surface (step S21), processing of acquiring the offset components (step S22), processing of determining a work surface (step S23), processing of instructing the position and the posture of the marker to the robot 1 (step S24), and processing of acquiring a relationship between the image coordinate system of the mobile camera 3 and the robot coordinate system (step S25), are performed in order.

Processing of Determining Reference Surface (Step S21)

First, as illustrated in FIG. 11, before performing the processing of determining the reference surface (step S21), the calibration member 70 which is gripped by the hand 102 is mounted on a work surface 611 of the work stand 61 in advance. After this, the processing of determining the reference surface (step S21) is performed.

Hereinafter, the processing of determining the reference surface (step S21) will be described in detail with reference to the flowchart illustrated in FIG. 12.

As illustrated in FIG. 12, when the processing of determining the reference surface (step S21) is started, first, the control device 5 drives the robot arm 10, and as illustrated in FIG. 12, the mobile camera 3 opposes the calibration member 70 (step S211).

Next, the control device 5 drives the robot arm 10, and moves the mobile camera 3 so that the first marker 71 attached to the calibration member 70 is positioned at the center part of the image of the mobile camera 3 (step S212).

Next, the control device 5 captures the first marker 71 by the mobile camera 3 (step S213). At this time, the control device 5 performs the processing (focusing processing) of moving the mobile camera 3 by driving the robot arm 10 so that the focal point of the mobile camera 3 is adjusted (focused) to the first marker 71. In addition, the focusing processing may be omitted.

Next, the control device 5 stores the image of the first marker 71 captured by the mobile camera 3 in the storage portion 54 as "first image", and stores the coordinate of the axial coordinates O6 in the robot coordinate system when the first image is captured is stored in the storage portion 54 (step S214). Here, in the processing of determining the reference surface in the mobile camera 3 (step S21), the first marker 71 is "first reference marker".

Next, the control device 5 drives the robot arm 10, and translationally moves the mobile camera 3 so that the second marker 72 is positioned at the center part of the image of the mobile camera 3 (step S215).

Next, the control device 5 captures the second marker 72 (n-th marker) by the mobile camera 3 (step S216).

Next, the shape and the size of the second marker 72 in the image captured by the mobile camera 3 in step S216, and the shape and the size of the first marker 71 in the first image stored in the storage portion 54 in step S214, are compared with each other (step S217). In addition, it is determined whether or not a difference between the shape and the size of the second marker 72 and the shape and the size of the first marker 71 is in a predetermined threshold value (step S218).

In a case where it is determined that the difference is in the predetermined threshold value ("YES" in step S218), the process moves to step S2110. Meanwhile, in a case where it is determined that the difference is not in the predetermined threshold value ("NO" in step S218), the mobile camera 3 is moved by the driving of the robot arm 10 to be in the predetermined threshold value (step S219).

Next, when it is determined that the difference is in the predetermined threshold value, the control device 5 stores the image of the second marker 72 (n-th marker) captured by the mobile camera 3 in the storage portion 54 as "second image (n-th marker)", and stores the coordinate of the axial coordinates O6 in the robot coordinate system when the second image (n-th marker) is captured in the storage portion 54 (step S2110). Here, in the processing of determining the reference surface in the mobile camera 3 (step S21), the second marker 72 is "second reference marker".

Next, it is determined whether or not the number n of the captured images is the number predetermined in advance (here, n is an integral number, and is the number which satisfies the relationship of 3≤n) (step S2111). In a case where it is determined that the number is the predetermined number, the process moves to step S2112, and in a case where it is determined that the number is less than the predetermined number, the above-described step S215 to step S2110 are repeated until it is determined that the number is the predetermined number.

Here, in the embodiment, it is set to capture three images (the first image, the second image, and the third image) by the mobile camera 3 in advance. Therefore, in the embodiment, after capturing the second image by the mobile camera 3, step S215 to step S2110 are performed one more time, the image of the third marker 73 captured by the mobile camera 3 is stored in the storage portion 54 as "third image", and the coordinate of the axial coordinates O6 in the robot coordinate system when the third image is captured is stored in the storage portion 54. Here, in the processing of determining the reference surface in the mobile camera 3 (step S21), the third marker 73 is "third reference marker".

Next, when it is determined that the number n of images is the predetermined number, based on the coordinate of the axial coordinates O6 in n (three in the embodiment) robot coordinate systems stored in the storage portion 54, the processing portion 53 acquires an origin point of a reference surface 82 parallel to the front surface 701 (a plane which passes through the first marker 71, the second markers 72, and the third marker 73) illustrated in FIG. 11, and each direction of the x axis, the y axis, and the z axis (step s2112).

In addition, the control device 5 defines the position and the posture of the reference surface 82 in the robot coordinate system, that is, the components xr, yr, zr, ur, vr, and wr of the reference surface 82 (step S2113).

As described above, according to the control device 5, an effect similar to that of the processing of determining the reference surface in the fixed camera 2 (step S11) can be achieved. In other words, since the images (the first image, the second image, and the third image) captured by the mobile camera 3 (imaging portion) are used, it is possible to acquire the posture of the reference surface 82 without coming into contact with the calibration member 70, and accordingly, for example, it is possible to acquire the posture of the reference surface 82 with high accuracy regardless of the material or the like of the calibration member 70. In addition, it is possible to more easily and rapidly acquire the posture of the reference surface 82 than the related art.

In addition, as described above, in the embodiment, the position and the posture of the reference surface 82 are acquired based on the size of the first marker 71 in the first image, the size of the second marker 72 in the second image, and the size of the second marker 72 in the third image. Therefore, in the embodiment, when the position and the posture of the reference surface 82 are acquired based on the size of the second marker 72 in each image, it is possible to accurately acquire the posture of the reference surface 82.

In addition, the acquiring of the position and the posture of the reference surface 82 based on the size of the second marker 72 in each image, is the same as the acquiring of the posture of the reference surface 82, based on a distance (first distance) between the first marker 71 when the first image is obtained and the light receiving surface 311 (more specifically, imaging reference point O3) of the mobile camera 3, a distance (second distance) between the second marker 72 when the second image is obtained and the light receiving surface 311 (imaging reference point O3), and a distance (third distance) between the third marker 73 when the third image is obtained and the light receiving surface 311 (imaging reference point O3). Therefore, according to the calibration method of the embodiment, it is possible to acquire the posture of the reference surface 82 based on the distance of the first distance, the second distance, and the third distance.

Furthermore, as described above, in the processing of determining the reference surface in the mobile camera 3 (step S21), by using the calibration member 70 to which the first marker 71, the second marker 72, and the third marker 73 of which the sizes are the same as each other are attached, the first image, the second image, and the third image are captured by the fixed camera 2 so that the sizes of the first marker 71, the second marker 72, and the third marker 73 are the same as each other on the image. According to the capturing, even when a focal length or an angle of view of the mobile camera 3 are not known, it is possible to acquire the reference surface 82 which is parallel (orthogonal to the optical axis OA3 of the mobile camera 3) to the front surface 701.

In addition, the capturing of the first image, the second image, and the third image by the mobile camera 3 so that the sizes of the first marker 71, the second marker 72 and the third marker 73 are the same as each other, is the same as the acquiring the posture of the reference surface 82 based on the first distance, the second distance, and the third distance which are the same as each other. Therefore, according to the calibration method of the embodiment, based on the first distance, the second distance, and the third distance which are the same as each other, even when the focal length or the angle of view of the mobile camera 3 is not known, it is possible to easily and rapidly acquire the reference surface 82 parallel to the front surface 701.

In addition, in the embodiment, each of the sizes of the first marker 71, the second marker 72, and the third marker 73 is the same as each other, but when the relationship between the sizes is known, the sizes may respectively vary. In this case, based on the relationship of the sizes of each of the first marker 71, the second marker 72, and the third marker 73, by acquiring the distance of the first distance, the second distance, and the third distance, it is possible to easily and rapidly acquire the reference surface 82 parallel to the front surface 701.

Processing of Acquiring Offset Components (Step S22)

Next, the processing of acquiring the offset components (step S22) will be described with reference to the flowchart illustrated in FIG. 13.

Here, as described above, on the design, the mobile camera 3 is offset and attached to the sixth arm 16 so that the optical axis OA3 is substantially parallel to the center axis A6 of the sixth arm 16. However, practically, a shift is generated from the offset component (the position and the posture of the mobile camera 3 with respect to the sixth arm 16) on the design. The shift is, for example, generated by an assembly error of the mobile camera 3 or an assembly error or the like of the imaging element 31 with respect to a housing of the mobile camera 3.

Here, in the processing of acquiring the offset components (step S22), the actual offset component (the position and the posture of the mobile camera 3 with respect to the sixth arm 16) is acquired.

In the following processing of acquiring the offset components (step S22), the offset components (Δx, Δx, Δy, Δu, Δv, and Δw) of the position of the imaging reference point O3 and the direction (posture) of the optical axis OA3 of the mobile camera 3 with respect to the axial coordinates O6 of the rotating axis member 161, are acquired.

In addition, in the embodiment, the offset components of the position of the imaging reference point O3 and the direction of the optical axis OA3 with respect to the axial coordinates O6 are acquired, but the location which becomes a reference when acquiring the offset components is arbitrary not being limited to the axial coordinates O6 and the imaging reference point O3.

As illustrated in FIG. 13, when the processing of acquiring the offset (step S22) is started, first, the control device 5 drives the robot arm 10, and detects the calibration member 70 by the mobile camera 3 (step S221).

Next, the control device 5 drives the robot arm 10 so that the light receiving surface 311 of the mobile camera 3 faces the front surface 701 of the calibration member 70 (step S222).

Next, the control device 5 verifies a degree of parallelization of the front surface 701 of the calibration member 70 with respect to the light receiving surface 311 of the mobile camera 3 (step S223). In addition, the control device 5 determines whether or not the degree of parallelization is in the predetermined threshold value (step S224).

As illustrated in FIG. 14, the degree of parallelization is verified by using a difference in pitches P between the adjacent markers 75 attached to the front surface 701 in the image. For example, as illustrated by a solid line in FIG. 14, the differences in pitches P1, P2, P3, and P4 between the adjacent markers 75 are substantially the same as each other, and in a case where the difference is in the predetermined threshold value, the process moves to step S225. Meanwhile, as illustrated by two-dot chain line in FIG. 14, a difference in pitches P1', P2', P3', and P4' between the adjacent markers 75 varies, and in a case where the difference exceeds the predetermined threshold value, step S221 to step S224 are repeated until the difference becomes in the predetermined threshold value. Here, being in the predetermined threshold value means that the above-described reference surface 82 and the optical axis OA3 are perpendicular to each other within the threshold value.

Next, when it is determined that the difference is in the predetermined threshold value, the control device 5 acquires offset components Δu, Δv, and Δw (step S225) from the difference between the components ur, vr, and wr of the axial coordinates O6 in the robot coordinate system when it is determined that the difference is in the threshold value, and the components ur, vr, and wr of the reference surface 82 in the robot coordinate system when the reference surface 82 is acquired in the above-described processing of determining the reference surface (step S21). The offset components Δu, Δv, and Δw correspond to the offset components Δu, Δv, and Δw of the optical axis OA3 with respect to the axial coordinates O6.

Next, as illustrated in FIG. 13, the control device 5 acquires the offset components Δx and Δy of the imaging reference point O3 with respect to the axial coordinates O6 (step S226). Hereinafter, a method of acquiring the offset components Δx and Δy will be described with reference to FIGS. 15 to 20. In addition, FIGS. 15 to 19 schematically illustrate, for example, the mobile camera 3 and the sixth arm 16 when the robot 1 is viewed from the upper part in the vertical direction.

Figure 15:
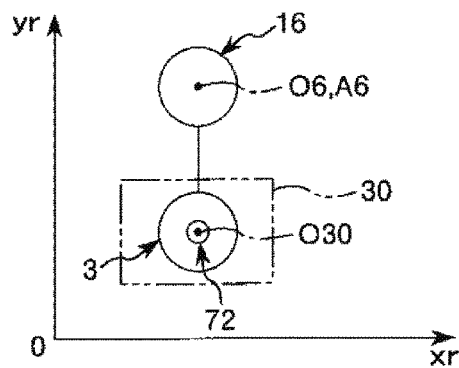
FIG. 15 is a view illustrating processing of acquiring offset components Δx and Δy illustrated in FIG. 13.

Schematically, first, as illustrated in FIG. 15, the control device 5 drives the robot arm 10 so that the second marker 72 is positioned at a center O30 (center of gravity) of an image 30 of the mobile camera 3. A state of the mobile camera 3 and the sixth arm 16 illustrated in FIG. 15 is "first state". Here, the center O30 of the image 30 and imaging reference point O3 match each other.

Figure 16:
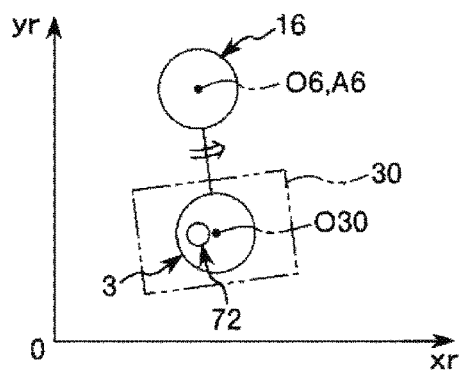
FIG. 16 is a view illustrating the processing of acquiring the offset components Δx and Δy illustrated in FIG. 13.

Next, as illustrated in FIG. 16, the control device 5 drives the robot arm 10 and rotates the sixth arm 16 around the center axis A6 by a predetermined angle. The predetermined angle at this time is a predetermined angle (for example, approximately 1° to 10°) in a range (in a range of being contained in an imaging region of the mobile camera 3) in which the second marker 72 does not go out of the image 30. A state of the mobile camera 3 and the sixth arm 16 illustrated in FIG. 16 is "second state".

Figure 17:
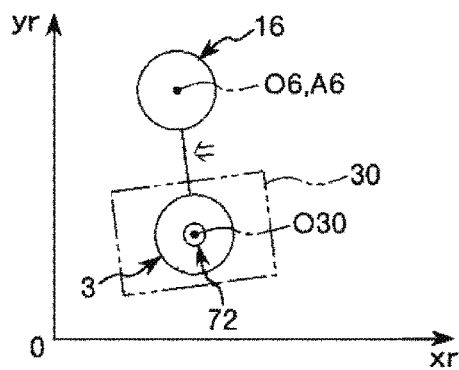
FIG. 17 is a view illustrating the processing of acquiring the offset components Δx and Δy illustrated in FIG. 13.

Next, as illustrated in FIG. 17, the control device 5 drives the robot arm 10 and translationally moves the mobile camera 3 and the sixth arm 16 in a plane parallel to the plane (x-y plane of the reference surface 82) including the xr axis and the yr axis in the robot coordinate system so that the second marker 72 matches the center O30. A state of the mobile camera 3 and the sixth arm 16 illustrated in FIG. 17 is "third state".

It is ascertained that the movement of the mobile camera 3 and the sixth arm 16 which are in the third state via the second state from the first state, is the same as the rotation of the axial coordinates O6 (sixth arm 16) around a line segment which passes through the imaging center O30 (imaging reference point O3) when the first state illustrated in FIG. 15 and the third state illustrated in FIG. 17 are viewed. Therefore, as illustrated in FIG. 20, the movement to the third state via the second state after the first state, is the same as the movement of the axial coordinates O6 around the line segment which passes through the center O30 (imaging reference point O3) by a rotation angle θ10. Therefore, based on the rotation angle θ10, the coordinate of the axial coordinates O6 in the robot coordinate system in a first state, and the coordinate of the axial coordinates O6 in the robot coordinate system in the third state, the coordinate of the imaging reference point O3 in the robot coordinate system is acquired. In addition, from the acquired coordinate of the imaging reference point O3 in the robot coordinate system and the coordinate of the axial coordinates O6 in the robot coordinate system in any one of the first state and the third state, virtual offset components Δx' and Δy' of the imaging reference point O3 with respect to the axial coordinates O6 are acquired.

Figure 18:
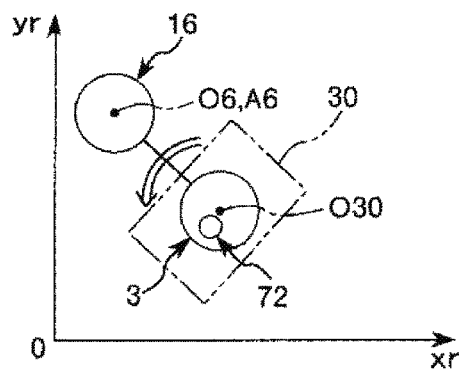
FIG. 18 is a view illustrating the processing of acquiring the offset components Δx and Δy illustrated in FIG. 13.

Next, as illustrated in FIG. 18, the control device 5 drives the robot arm 10 based on the virtual offset components Δx' and Δy' so that the second marker 72 does not go out of the image 30, and rotates the axial coordinates O6 around the line segment which passes through the imaging reference point O3 (center O30) by the predetermined angle. A state of the mobile camera 3 and the sixth arm 16 illustrated in FIG. 18 is "fourth state".

Figure 19:
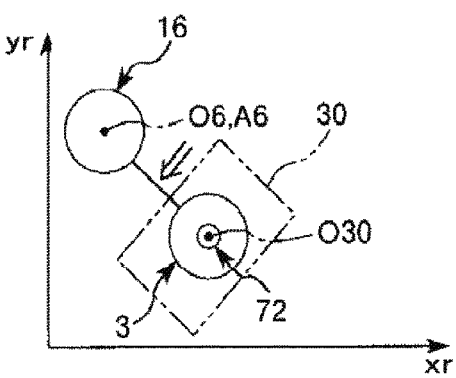
FIG. 19 is a view illustrating the processing of acquiring the offset components Δx and Δy illustrated in FIG. 13.

Next, as illustrated in FIG. 19, the control device 5 drives the mobile camera 3 and the sixth arm 16 in parallel in a plane parallel to a plane (x-y plane of the reference surface 82) including the xr axis and the yr axis in the robot coordinate system by the driving of the robot arm 10, and positions the second marker 72 to the center O30 of the image 30. A state of the mobile camera 3 and the sixth arm 16 illustrated in FIG. 19 is "fifth state".

It is ascertained that the movement of the mobile camera 3 and the sixth arm 16 which are in the fifth state via the second state, the third state, and the fourth state from the first state, is the same as the rotation of the axial coordinates O6 around the line segment which passes through the imaging center O30 (imaging reference point O3) when the first state illustrated in FIG. 15 and the fifth state illustrated in FIG. 19 are viewed. Therefore, as illustrated in FIG. 20, the movement to the fifth state via the second state, the third state, and the fourth state after the first state, is the same as the movement of the axial coordinates O6 around the line segment which passes through the center O30 (imaging reference point O3) by a rotation angle θ1. Therefore, based on the rotation angle θ1, the coordinate of the axial coordinates O6 in the robot coordinate system in a first state, and the coordinates of the axial coordinates O6 in the robot coordinate system in the fifth state, the coordinate of the imaging reference point O3 in the robot coordinate system is acquired. In addition, from the acquired coordinate of the imaging reference point O3 in the robot coordinate system and the coordinate of the axial coordinates O6 in the robot coordinate system in any one of the first state and the fifth state, the offset components Δx and Δy of the imaging reference point O3 with respect to the axial coordinates O6 are acquired.

According to the processing, it is possible to easily acquire the offset components Δx and Δy of the imaging reference point O3 with respect to the axial coordinates O6 with high accuracy.

In addition, as described above, in the embodiment, by performing the processing of transiting to the third state via the second state from the first state, the virtual components Δx' and Δy' are computed. In other words, by rotating the sixth arm 16 around the center axis A6 by an extremely small angle in a range where the second marker 72 is contained in the image 30 (in the imaging region) of the mobile camera 3, the virtual components Δx' and Δy' are computed. By performing the movement from the third state to the fourth state by using information of the virtual components Δx' and Δy', it is possible to surely give the second marker 72 to the inside of the image 30 in the fourth state.

Next, as illustrated in FIG. 13, the control device 5 acquires an offset component Δz of the imaging reference point O3 with respect to the axial coordinates O6 (step S227). Hereinafter, a method of acquiring the offset component Δz will be described with reference to FIG. 21. In addition, FIG. 21 illustrates a process of the mobile camera 3 and the sixth arm 16 when the offset component Δz is acquired, and for convenience of the description, the mobile camera 3 illustrated by a solid line in FIG. 21 is illustrated at a position of "mobile camera 3 on the design", and a mobile camera 3' illustrated by a dotted line in FIG. 21 is illustrated at a position of "actual mobile camera 3".

As illustrated in FIG. 21, first, for example, the control device 5 drives the robot arm 10 so that the second marker 72 is given to the center of the image of the mobile camera 3', and a state A illustrated in FIG. 21 is achieved. Next, the control device 5 captures the second marker 72 by the mobile camera 3', and acquires a distance H between the light receiving surface 311 of the mobile camera 3 and the second marker 72 which are illustrated in FIG. 21.

Here, in the embodiment, the focal length of the mobile camera 3 is acquired in advance, and is known. Therefore, the distance H can be computed, for example, from the focal length of the mobile camera 3, "pixel" which is the length of the pitches between the markers 75 in the image of the mobile camera 3, and "mm" which is the pitches between the actual markers 75.

In addition, the focal length of the mobile camera 3 can also be acquired, for example, from "pixel" which is the length of the pitches between the markers 75 on the image, and "mm" which is the pitches between the actual markers 75, before and after the operation in a case where the mobile camera 3 is moved only by an extremely small amount in the optical axis OA3 direction (zr direction) while giving the marker 75 of the calibration member 70.

Next, as illustrated in a state B in FIG. 21, the control device 5 drives the robot arm 10, and allows the mobile camera 3' to be inclined only by an angle θ2 based on the offset component Δz on the design.

Next, as illustrated in a state C in FIG. 21, the control device 5 drives the robot arm 10, and translationally moves mobile camera 3' in a surface parallel to a plane (x-y plane of the reference surface 82) including the xr axis and the yr axis in the robot coordinate system so that the second marker 72 is given to the center of the image of the mobile camera 3' while maintaining a posture of the mobile camera 3' of the state B. In addition, the control device 5 acquires a moving distance X' (specifically, a moving distance of the imaging reference point O3 in a surface parallel to the x-y plane of the reference surface 82 based on the offset component Δz on the design) of the axial coordinates O6 in the robot coordinate system at this time.

Next, the control device 5 acquires a correction amount ΔH for acquiring the actual offset component Δz of the mobile camera 3' by the following equation (1).

$$\Delta H = \frac{X'}{\tan\theta 2} - H \quad (1)$$

Next, the control device 5 acquires the actual offset component Δz based on the correction amount ΔH and the offset component Δz on the design.

In this manner, it is possible to acquire the offset component Δz. According to the processing, it is possible to easily compute the offset component Δz.

Next, as illustrated in FIG. 13, the control device 5 updates data to the acquired actual offset components Δx, Δy, Δz, Δu, Δv, and Δw, from the offset components on the design (step S228).

By doing so, the processing of acquiring the offset (step S22) illustrated in FIG. 10 is finished.

Processing of Determining Work Surface (Step S23)

Next, as illustrated in FIG. 10, the processing of determining the work surface (step S23) is performed. The processing of determining the work surface (step S23) is processing of acquiring the position and the posture of a work surface 611 in the robot coordinate system, that is, processing of acquiring components xr, yr, zr, ur, vr, and wr of the work surface 611.

Here, the work surface 611 is parallel to the reference surface 82, and is at a position offset in the normal line direction (zr direction) of the reference surface 82. Therefore, in the processing of determining the work surface (step S23), by determining the offset amount in the normal line direction (zr direction) with respect to the reference surface 82 of the work surface 611, it is possible to acquire the components xr, yr, zr, ur, vr, and wr of the work surface 611.

The offset amount in the normal line direction (zr direction) with respect to the reference surface 82 of the work surface 611 can be acquired based on the focal length of the mobile camera 3 acquired in advance, the number of pixels of the mobile camera 3 with respect to a value (actual size) of the pitches between the adjacent markers 75 of the calibration member 70, and the actual offset component described above.

By acquiring the position and the posture of the work surface 611 in the robot coordinate system in this manner, the robot 1 can perform the work with respect to the target mounted on the work surface 611 with high accuracy.

Processing of Instructing Position and Posture Marker to Robot (Step S24)

Next, as illustrated in FIG. 10, the processing of instructing the position and the posture of the marker to the robot 1 (step S24) is performed.

Here, for example, the robot coordinate of the second marker 72 in the x-y plane of the reference surface 82 (or work surface 611) is instructed to the robot 1.

Specifically, first, the control device 5 aligns the optical axis OA2 of the mobile camera 3 to the z axis of the reference surface 82, based on the position of the imaging reference point O3 and the offset component in the direction of the optical axis OA3 with respect to the axial coordinates O6 computed by the above-described processing of acquiring the offset components (step S22). After this, the control device 5 translationally moves the mobile camera 3 in the surface parallel to the x-y plane of the reference surface 82 by the driving of the robot arm 10, and allows the second marker 72 to match the center of the image of the mobile camera 3. In addition, the control device 5 instructs the position of the imaging reference point O3 of the mobile camera 3 and the robot coordinate of the second marker 72 when the second marker 72 matches the center of the image of the mobile camera 3.

In addition, for example, by bringing an instruction tool (touch-up hand) of which the offset is known in the axial coordinates O6 into contact with the second marker 72, the position and the posture of the second marker 75 may be instructed to the robot 1. However, by capturing the image of the second marker 72 by the mobile camera 3, it is preferable to instruct the position and the posture of the second marker 72 to the robot 1, for example, since it is possible to instruct the second marker 72 with high accuracy regardless of the material or the like of the calibration member 70.

Processing of Acquiring Relationship Between Image Coordinate System of Mobile Camera and Robot Coordinate System (Step S25)

Next, as illustrated in FIG. 10, the processing of acquiring the relationship between the image coordinate system of the mobile camera and the robot coordinate system (step S25) is performed.

The processing of acquiring the relationship between the image coordinate system of the mobile camera and the robot coordinate system (step S25) is similar to the above-described processing of acquiring the relationship between the image coordinate system of the fixed camera and the robot coordinate system (step S12) except that the reference surface is determined by using the calibration member 70 disposed on the work surface 611, and the second marker 72 (marker of which the robot coordinate is known) of the calibration member 70 installed on the work surface 611 is captured nine times while moving the mobile camera 3 to nine locations by driving the robot arm 10.

Therefore, when the processing of acquiring the relationship between the image coordinate system of the mobile camera 3 and the robot coordinate system (step S25) is finished, it is possible to acquire the correction parameter (transformation matrix) which converts the image coordinate of the fixed camera 2 into the coordinate of the reference surface 82 in the robot coordinate system based on the coordinates (components xb, yb, and ub) of the second marker 72 in the image coordinate system of the mobile camera 3 based on the nine images, and the acquired coordinates (components xr, yr, and ur) of the reference surface 82 in the robot coordinate system in the above-described step S21.

When the correction parameter acquired in this manner is used, it is possible to convert the position and the posture (specifically, components xb, yb, and ub) of the target or the like captured by the mobile camera 3 into a value (specifically, components xr, yr, and ur) in the robot coordinate system.

In addition, as described above, since the processing of acquiring the relationship between the image coordinate system of the mobile camera and the robot coordinate system (step S25) is substantially similar to the above-described processing of acquiring the relationship between the image coordinate system of the fixed camera 2 and the robot coordinate system (step S12), the description (processing contents and effects) thereof will be omitted.

Accordingly, the calibration of the imaging portion illustrated in FIG. 4 is finished.

According to the calibration method of the imaging portion, since it is possible to acquire the postures of the reference surfaces 81 and 82 based on the images which are respectively captured by the fixed camera 2 and the mobile camera 3, it is possible to omit the determination by the worker unlike the related art. Therefore, it is possible to reduce a human error or variation caused by the worker, and accordingly, it is possible to perform the calibration with high accuracy.

Second Embodiment

Next, a second embodiment of the invention will be described.

Figure 22:
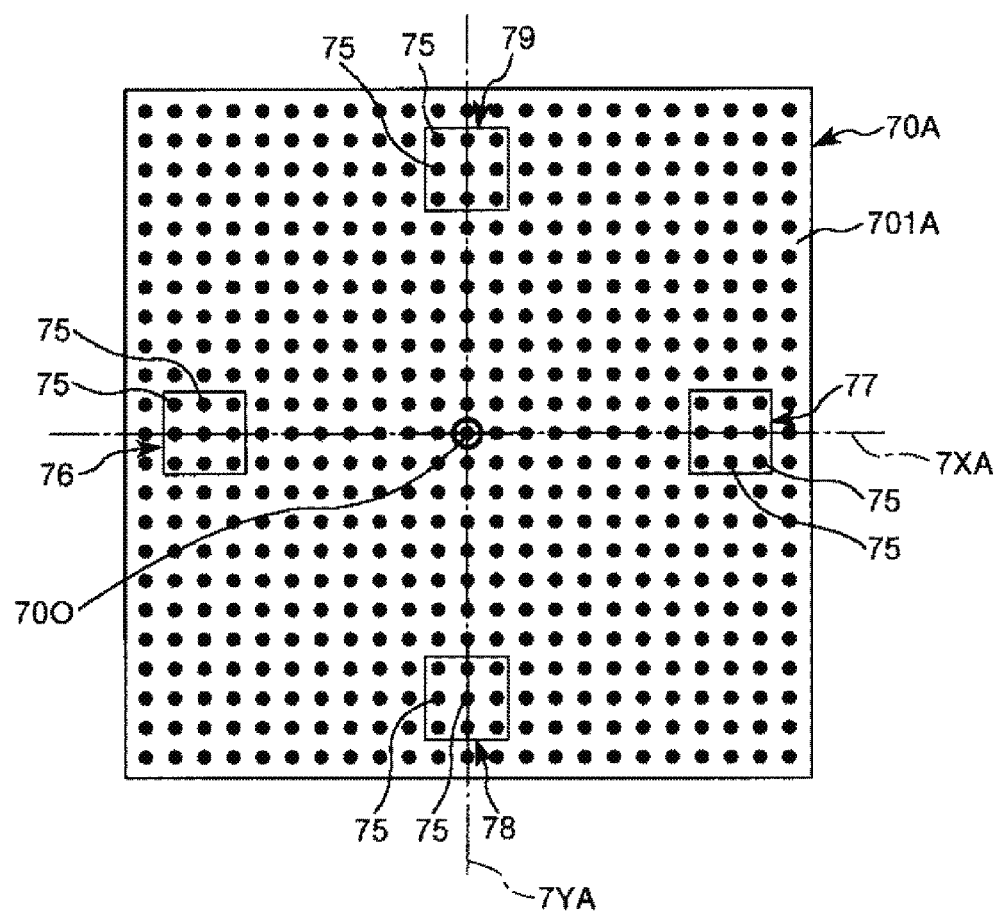
FIG. 22 is a plan view of the calibration member which is used in calibrating the imaging portion that uses a robot system according to a second embodiment of the invention.
Figure 23:
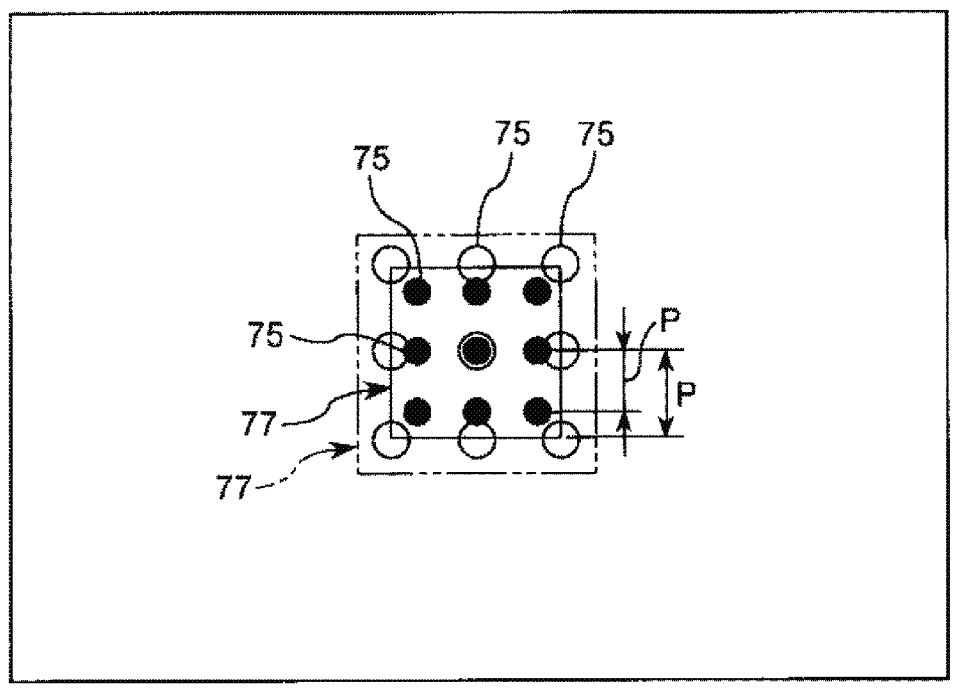
FIG. 23 is a view illustrating comparison of the first marker with the n-th marker in processing of determining a reference surface in the second embodiment.

FIG. 22 is a plan view of the calibration member which is used in calibrating the imaging portion that uses the robot system according to the second embodiment of the invention. FIG. 23 is a view illustrating comparison of the first marker with the n-th marker in the processing of determining the reference surface in the second embodiment.

The calibration method of the imaging portion which uses the robot system according to the embodiment is similar to the above-described first embodiment except that the configuration of the calibration member and a part of the processing of determining the reference surface are different.

In addition, in the following description, regarding the second embodiment, the description will focus on the difference from the above-described embodiment, and the description of similar parts will be omitted. In addition, in FIGS. 22 and 23, configurations similar to those of the above-described embodiment will be given the same reference numeral.

The plurality of markers 75 are attached to a front surface 701A of a calibration member 70A illustrated in FIG. 22. A quadrangular frame which surrounds nine markers 75 are further attached to nine markers 75 which are positioned on a left side in FIG. 22, nine markers 75 which are positioned on a right side in FIG. 22, nine markers 75 which are positioned on a lower side in FIG. 22, and nine markers 75 which are positioned on an upper side in FIG. 22 among the plurality of markers 75. Among the markers configured of the nine markers 75 and the quadrangular frame which surrounds the markers 75, the marker which is positioned on the left side in FIG. 22 is "first marker 76", the marker which is positioned on the right side in FIG. 22 is "second marker 77", the marker which is positioned on the lower side in FIG. 22 is "third marker 78", and the marker which is positioned on the upper side in FIG. 22 is "fourth marker 79". Each of the first marker 76, the second marker 77, the third marker 78, and the fourth marker 79 is used as the reference marker.

Processing of Determining Reference Surface (Step S11)

In the embodiment, in step S114 illustrated in FIG. 8, the image of the second marker 77 captured by the fixed camera 2 is stored in the storage portion 54 as "first image", and the coordinate of the axial coordinates O6 in the robot coordinate system when the first image is captured is stored in the storage portion 54.

In addition, in step S117, the pitches P between the plurality of markers 75 of the second marker 77 captured by the fixed camera 2 in step S116, and the pitches P between the plurality of markers 75 of the second marker 77 in the first image stored in the storage portion 54, are compared with each other. For example, as illustrated in FIG. 23, the pitches P between the plurality of markers 75 of the second marker 77 (n-th marker) illustrated by a two-dot chain line in FIG. 23, is different from the pitches P between the plurality of markers 75 of the second marker 77 in the first image illustrated by a solid line in FIG. 23, and in a case where the difference in pitch P is not in the predetermined threshold value, the calibration member 70 is translationally moved in the zr-axis direction by the driving of the robot arm 10 to be in the predetermined threshold value (step S119).

Next, when it is determined that the difference in pitch P is in the predetermined threshold value, in step S1110, the control device 5 stores the image of the second marker 77 captured by the fixed camera 2 in the storage portion 54 as "second image (n-th image), and stores the coordinate of the axial coordinates O6 in the robot coordinate system when the second image is captured in the storage portion 54.

Here, in the embodiment, it is set to capture the three images (the first image, the second image, and the third image) by the fixed camera 2 in advance. Therefore, in the embodiment, after the second image is captured by the fixed camera 2, step S115 to step S1110 are performed two more times, the calibration member 70 is moved by the driving of the robot arm 10, the image of the second marker 77 captured by the fixed camera 2 is stored in the storage portion 54 as "third image", and the coordinate of the axial coordinates O6 in the robot coordinate system when the third image is captured is stored in the storage portion 54.

In this manner, in the embodiment, the first image, the second image, and the third image, in which the pitch (first interval) between the markers 75 of the second marker 77 in the first image, the pitch (second interval) between the markers 75 of the second marker 77 in the second image, and the pitch (third interval) between the markers 75 of the second marker 77 in the third image are the same as each other, are captured. Accordingly, it is possible to acquire the posture of the reference surface 81 based on the pitch between the markers 75 in each image. Here, as described in the first embodiment, in the method of using the size of the second marker 77 in each image, the size of the second marker 77 on the image is likely to change according to a focusing degree of the fixed camera 2. Meanwhile, as described in the embodiment, according to the method of using the pitches (distance between the centers of gravity of the markers 75) between the markers 75, it is possible to more accurately acquire the reference surface 81 regardless of the focusing degree.

Processing of Determining Reference Surface (Step S21)

In the embodiment, in step S214 illustrated in FIG. 12, the image of the first marker 76 captured by the mobile camera 3 is stored in the storage portion 54 as "first image", and the coordinate of the axial coordinates O6 in the robot coordinate system when the first image is captured is stored in the storage portion 54.

In addition, in step S217, the pitches P between the plurality of markers 75 of the second marker 77 captured by the mobile camera 3 in step S216, and the pitches P between the plurality of markers 75 of the first marker 76 in the first image stored in the storage portion 54, are compared with each other. In a case where the difference in pitch P is not in the predetermined threshold value, the mobile camera 3 is translationally moved in the zr-axis direction with respect to the calibration member 70 by the driving of the robot arm 10 to be in the predetermined threshold value (step S219).

Next, when it is determined that the difference in pitch P is in the predetermined threshold value, in step S2110, the control device 5 stores the image of the second marker 77 captured by the mobile camera 3 in the storage portion 54 as "second image (n-th image)", and the coordinate of the axial coordinates O6 in the robot coordinate system when the second image is captured is stored in the storage portion 54.

Here, in the embodiment, it is set to capture the four images (the first image, the second image, the third image, and the fourth image) by the fixed camera 2 in advance. Therefore, in the embodiment, after the second image is captured by the fixed camera 2, step S215 to step S2110 are performed two more times. Therefore, in the embodiment, the image of the third marker 78 captured by the mobile camera 3 is stored in the storage portion 54 as "third image", and the coordinate of the axial coordinates O6 in the robot coordinate system when the third image is captured is stored in the storage portion 54. In addition, the image of the fourth marker 79 captured by the mobile camera 3 is stored in the storage portion as "fourth image", and the coordinate of the axial coordinates O6 in the robot coordinate system when the fourth image is captured is stored in the storage portion 54. Here, in the processing of determining the reference surface in the mobile camera 3 (step S21) in the embodiment, the fourth marker 79 is "fourth reference marker".

In this manner, in the embodiment, the first image, the second image, the third image, and the fourth image, in which the pitch (first interval) between the markers 75 of the first marker 76 in the first image, the pitch (second interval) between the markers 75 of the second marker 77 in the second image, the pitch (third interval) between the markers 75 of the third marker 78 in the third image, and the pitch (fourth interval) between the markers 75 of the fourth marker 79 in the fourth image are the same as each other, are captured. Accordingly, it is possible to acquire the posture of the reference surface 81 based on the pitch between the markers 75 in each image.

In addition, by using the calibration member 70A in which the first interval, the second interval, the third interval, and the fourth interval are the same as each other, by capturing the first image, the second image, the third image, and the fourth image so that the first interval in the first image, the second interval in the second image, the third interval in the third image, and the fourth interval in the fourth image are the same as each other, it is possible to easily and rapidly acquire the reference surface 82 parallel to the front surface 701.

In addition, in the embodiment, all of the first interval, the second interval, the third interval, and the fourth interval are the same as each other, but the relationship of the intervals (pitches) is known, the intervals (pitches) may be different from each other. In this case, based on the relationship of the intervals (pitches), such as each of the first interval, the second interval, the third interval, and the fourth interval, it is possible to acquire the reference surface 82 parallel to the front surface 701.

In addition, as illustrated in FIG. 22, the first marker 76, the second marker 77, the third marker 78, and the fourth marker 79 which are attached to the calibration member 70A, are disposed so that a first straight line 7XA which passes through the first marker 76 and the second marker 77, and a second straight line 7YA which passes through the third marker 78 and the fourth marker 79 intersect each other. Therefore, it is possible to acquire the first straight line 7XA from the coordinate of the first marker 76 in the robot coordinate system when the first image is captured and the coordinate of the second marker 77 in the robot coordinate system when the second image is captured, to acquire the second straight line 7YA from the coordinate of the third marker 78 in the robot coordinate system when the third image is captured and the coordinate of the fourth marker 79 in the robot coordinate system when the fourth image is captured, and to acquire an origin point 700 of the reference surface 82 and each direction of the x axis, the y axis, and the z axis based on the acquired first straight line 7XA and the second straight line 7YA. By determining the origin point 700 of the reference surface 82 and each direction of the x axis, the y axis, and the z axis in this manner, a worker easily ascertains the position of the reference surface 82.

Third Embodiment

Next, a third embodiment of the present invention will be described.

Figure 24:
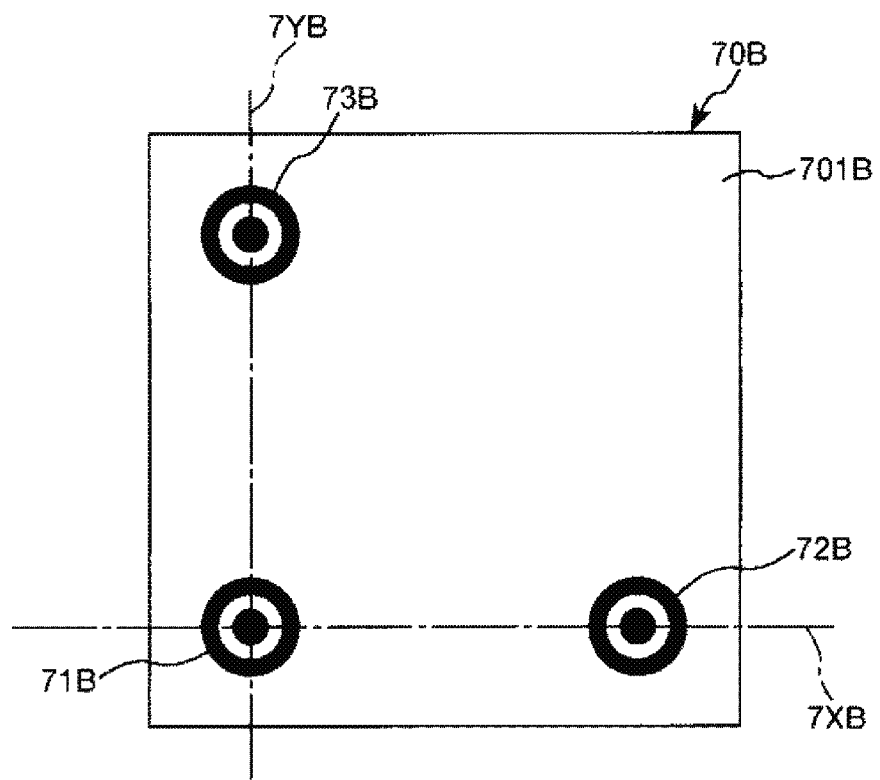
FIG. 24 is a plan view of the calibration member which is used in calibrating the imaging portion that uses a robot system according to a third embodiment of the invention.

FIG. 24 is a plan view of the calibration member which is used in calibrating the imaging portion that uses the robot system according to the third embodiment of the invention.

The calibration method of the imaging portion which uses the robot system according to the embodiment is similar to that of the above-described first embodiment except that the configuration of the calibration member is different.

In addition, in the following description, regarding the third embodiment, the description will focus on the difference from the above-described embodiment, and the description of similar parts will be omitted. In addition, in FIG. 24, configurations similar to the above-described embodiment will be given the same reference numeral.

A first marker 71B, a second marker 72B, and a third marker 73B are attached to a front surface 701B of a calibration member 70B illustrated in FIG. 24.

By the calibration member 70B to which the three first marker 71B, the second marker 72B, and the third marker 73B are attached, similar to the processing of determining the reference surface of the mobile camera 3 (step S21) in the above-described second embodiment, it is also possible to acquire a first straight line 7XB from the coordinate of the first marker 71B in the robot coordinate system when the first image is captured and the coordinate of the second marker 72B in the robot coordinate system when the second image is captured, and to acquire a second straight line 7YB from the coordinate of the first marker 71B in the robot coordinate system when the first image is captured and the coordinate of the third marker 73B in the robot coordinate system when the third image is captured. In addition, it is possible to acquire each direction of the x axis, the y axis, and the z axis of the reference surface 82 considering the first marker 71B as the origin point.

Above, the control device, the robot, and the robot system according to the invention are described based on the embodiments illustrated in the drawings, but the invention is not limited thereto, and configurations of each portion can be replaced with arbitrary configurations having similar functions. In addition, other arbitrary configuration elements may be added. In addition, the invention may be combined with two or more arbitrary configurations (characteristics) among each of the above-described embodiments.

In addition, in the embodiment, a case where 6-axis vertical articulated robot is used is described as an example, but the robot according to the invention may be a robot other than the vertical articulated robot, for example, a horizontal articulated robot. In addition, the horizontal articulated robot has a configuration in which a base; a first arm which is connected to the base, and extends in the horizontal direction; and a second arm which is connected to the first arm, and has a part that extends in the horizontal direction are provided. In addition, in a case where the robot according to the invention is the horizontal articulated robot, by performing the calibration as described above, for example, it is possible to ascertain whether or not the robot is installed in parallel to the work surface, or whether or not the fixed camera is installed so that the optical axis of the fixed camera is vertical to the surface including the xr axis and the yr axis in the robot coordinate system.

In addition, in the embodiment, the number of rotating axes of the robot arm of the robot is six, but in the invention, not being limited thereto, and the number of rotating axes of the robot arm may be, for example, two, three, four, five, seven, or more. In addition, in the embodiment, the number of arms of the robot is six, but in the embodiment, not being limited thereto, and the number of arms of the robot may be, for example, two, three, four, five, seven or more.

In addition, in the embodiment, the number of robot arms of the robot is one, but in the invention, not being limited thereto, and the number of robot arms of the robot may be, for example, two or more. In other words, the robot may be a robot having a plurality of arms, such as a double arm robot.

In addition, in the embodiment, the fixed camera and the mobile camera which function as the imaging portions are respectively configured to have the imaging element and the lens, but the imaging portion according to the invention may have any configuration as long as the first marker, the second marker, and the third marker can perform the capturing.

In addition, in the embodiment, the calibration of the fixed camera is performed by using the calibration member, but in the calibration of the fixed camera, the calibration member may not be used. In a case where the calibration member is not used, for example, one marker may be attached to the tip end part (axial coordinates) of the robot arm, and the first marker may be used as the reference marker. In this case, one marker serves as "first reference marker, second reference marker, and third reference marker".

The entire disclosure of Japanese Patent Application No. 2015-235250, filed Dec. 1, 2015 is expressly incorporated by reference herein.

What is claimed is:

1. A calibration system for a robot including at least one arm, the calibration system comprising:
   a first imaging portion that captures a first set of images of a calibration member wherein:
      the calibration member is positioned to at least one of a first position, a second position, and a third position,
      the first set of images includes at least one of a first image, a second image, and a third image,
      at the first position, the first imaging portion captures the first image containing a first reference marker,
      at the second position, the first imaging portion captures the second image containing a second reference marker,
      at the third position, the first imaging portion captures the third image containing a third reference marker,
      the first position, the second position, and the third position are different from each other, and
      the first imaging portion is detached from the robot; and
   a control device that:
      changes a posture of the at least one arm;
      in response to changing the posture of the at least one arm a distance between the first imaging portion and the calibration member is changed;
      determines a posture of a first reference surface that is parallel to a plane which passes through the first reference marker, the second reference marker, and the third reference marker based on in the first set of images; and
      controls the robot based on the first reference surface.

2. The calibration system of claim 1 further comprising a second imaging portion that captures a second set of images of the calibration member wherein:
   the calibration member is positioned to at least one of a fourth position, a fifth position, and a sixth position in the second set of images;
   the second set of images includes at least one of a fourth image, a fifth image, and a sixth image;
   at the fourth position, the second imaging portion captures the fourth image containing a fourth reference marker;
   at the fifth position, the second imaging portion captures the fifth image containing a fifth reference marker;
   at the sixth position, the second imaging portion captures the sixth image containing a sixth reference marker;
   the second imaging portion is attached to the robot; and
   the control device:
      in response to changing a posture of the at least one arm, a second distance between the second imaging portion and the calibration member is changed;
      determines a posture of a second reference surface that is parallel to a plane which passes through the fourth reference marker, the fifth reference marker, and the sixth reference marker based on the second set of images;
      controls the robot based on the posture of the second reference surface; and
      the posture of the first reference surface is determined based on coordinates of an arbitrary part of the robot in a robot coordinate system when the first image is captured, the coordinates of the arbitrary part in the robot coordinate system when the second image is captured, and the coordinates of the arbitrary part in the robot coordinate system when the third image is captured.

3. The calibration system according to claim 1, wherein the posture of the first reference surface is determined based on a size of the first reference marker in the first image, a size of the second reference marker in the second image, and a size of the third reference marker in the third image.

4. The calibration system according to claim 1, wherein the first image, the second image and the third image are captured to allow a size of the first reference marker in the first image, a size of the second reference marker in the second image, and a size of the third reference marker in the third image to be the same as each other.

5. The calibration system according to claim 1, wherein:
   the calibration member includes a plurality of markers which are disposed at a predetermined interval;
   the first image includes the plurality of markers;
   the second image includes the plurality of markers;
   the third image includes the plurality of markers; and
   the posture of the first reference surface is determined based on a first interval between the plurality of markers in the first image, a second interval between the plurality of markers in the second image, and a third interval between the plurality of markers in the third image.

6. The calibration system according to claim 5, wherein the first image, the second image, and the third image are captured so that the first interval in the first image, the second interval in the second image, and the third interval in the third image are the same as each other.

7. The calibration system according to claim 1, wherein the first reference surface is orthogonal to an optical axis of the first imaging portion.

8. The calibration system according to claim 1, wherein the posture of the first reference surface is determined based on a first distance between the first reference marker and an imaging reference point of the first imaging portion, a second distance between the second reference marker and the imaging reference point of the first imaging portion, and a third distance between the third reference marker and the imaging reference point of the first imaging portion.

9. The calibration system according to claim 8, wherein the first distance, the second distance, and the third distance are the same as each other.

10. The calibration system according to claim 2, wherein an origin of the first reference surface is determined.

11. The calibration system according to claim 10, wherein:
the calibration member is positioned at a seventh position;
the seventh position is different than the first position, the second position, the third position, the fourth position, the fifth position, and the sixth position;
at the seventh position, the first imaging portion captures a seventh image containing a seventh reference marker; and
in a case where a first straight line which passes through the first reference marker and the second reference marker, and a second straight line which passes through the third reference marker and the seventh reference marker, are disposed to intersect each other, the control device determines the first straight line and the second straight line from the coordinates of the first reference marker in the robot coordinate system when the first image is captured, the coordinates of the second reference marker in the robot coordinate system when the second image is captured, the coordinates of the third reference marker in the robot coordinate system when the third image is captured, and the coordinates of the seventh reference marker in the robot coordinate system when the seventh image is captured, and the control device determines the origin point of the first reference surface in the robot coordinate system based on the first straight line and the second straight line.

12. A robot system comprising:
the calibration system according to claim 1; and
the robot including the at least one arm which is controlled by the control device,
wherein a center axis of the at least one arm is orthogonal to the first reference surface.

13. A robot system comprising:
the calibration system according to claim 2; and
the robot including the at least one arm which is controlled by the control device,
wherein a center axis of the at least one arm is orthogonal to the first reference surface.

14. A robot system comprising:
the calibration system according to claim 3; and
the robot including the at least one arm which is controlled by the control device,
wherein a center axis of the at least one arm is orthogonal to the first reference surface.

15. A robot system comprising:
the calibration system according to claim 4; and
the robot including the at least one arm which is controlled by the control device,
wherein a center axis of the at least one arm is orthogonal to the first reference surface.

16. The calibration system according to claim 2, wherein:
the first reference surface and the second reference surface are different from each other,
the second imaging portion is attached to the at least one arm of the robot; and
an optical axis of the second imaging portion is substantially parallel to a center axis of the at least one arm.

17. The calibration system according to claim 2, wherein:
the second reference surface is orthogonal to an optical axis of the second imaging portion; and
the control device determines an origin of the second reference surface; and
the fourth position, the fifth position, and the sixth position are different from each other and different from the first position, the second position, and the third position.

18. The calibration system according to claim 2, wherein an optical axis of the second imaging portion is substantially parallel with a center axis of the at least one arm.

19. The calibration system according to claim 2, wherein the posture of the first reference surface is determined before the posture of the second reference surface.

20. A robot calibration system comprising:
a robot having at least one arm;
a calibration member associated with the robot;
an imaging portion associated with the robot, the imaging portion including:
a first imaging portion that captures a first set of images, wherein the first set of images includes at least one of a first image, a second image and a third image of the calibration member; and
a second imaging portion that captures a second set of images, wherein the second set of images includes at least one of: a fourth image, a fifth image, and a sixth image of the calibration member;
a control device associated with the robot, the control device:
determining a posture of a first reference surface based on the first set of images;
determining a posture of a second reference surface based on the second set of images; and
converting image coordinates of the first imaging portion and images coordinates of the second imaging portion into coordinates of a robot coordinate system based on at least one of the first reference surface and the second reference surface,
wherein the robot is controlled in accordance with the robot coordinate system.

* * * * *